United States Patent [19]

Sullivan et al.

[11] 4,213,252
[45] Jul. 22, 1980

[54] REPEATING PATTERN SIMULATION OF A POLYGON FACE OBJECT SYSTEM

[75] Inventors: John B. Sullivan, Santa Clara; David R. Marsh, Los Altos, both of Calif.

[73] Assignee: The Singer Company, Binghamton, N.Y.

[21] Appl. No.: 903,414

[22] Filed: May 8, 1978

[51] Int. Cl.² .......................... G09B 9/08; H04N 7/18
[52] U.S. Cl. .................................. 35/10.24; 35/12 N; 358/103; 364/521
[58] Field of Search ................................. 364/515–522; 35/10.2, 12 N; 358/103, 104

[56] References Cited

U.S. PATENT DOCUMENTS

| | | | |
|---|---|---|---|
| 3,899,662 | 8/1975 | Kreeger et al. | 364/522 |
| 3,996,672 | 12/1976 | Osofsky et al. | 35/10.2 |
| 3,996,673 | 12/1976 | Vorst et al. | 35/10.2 |
| 4,027,403 | 6/1977 | Marsh et al. | 35/10.2 |
| 4,078,317 | 3/1978 | Wheatley | 358/104 |
| 4,107,780 | 8/1978 | Grimsdale et al. | 364/521 |

*Primary Examiner*—Felix D. Gruber
*Attorney, Agent, or Firm*—Paul Hentzel; J. Dennis Moore; Jeffrey Rothenberg

[57] ABSTRACT

The terrain objects within the data base for an aircraft flight simulation system are formed by polygon faces and include certain objects formed by repetitive patterns of equally spaced identical polygon faces. More specifically, objects such as runway markings, which are a series of elongated narrow rectangles equally spaced along the length of the runway. The image data is arranged in a particular format including instruction words for identifying the type of data in the data words following each instruction word, and for controlling the flow of data through the image processor. The image data formatted and processed includes:

Initialization vectors (Vo), defining the position of landmark points (i.e., the first vertex of the initial polygon of each series of faces).

Delta data (shape data), defining the position of other points, (i.e., the remaining vertices of each initial face) with respect to the initial point therefor.

Increment data defining the uniform spacing between adjacent identical faces of each series.

Series data defining the number of identical faces in each series.

The image processor translates initial position data into the aircraft coordinate system, then rotates, clips, and projects each three-dimensional position vector to form two-dimensional display vectors (Vd). Raster scanlines are generated from the display vectors Vd of each face for display on a CRT.

16 Claims, 20 Drawing Figures

Fig_1

TRANSLATION STAGE 60

Fig_4
ROTATION STAGE 62

Fig_6
PROJECTION STAGE 64

EDGE STAGE 65

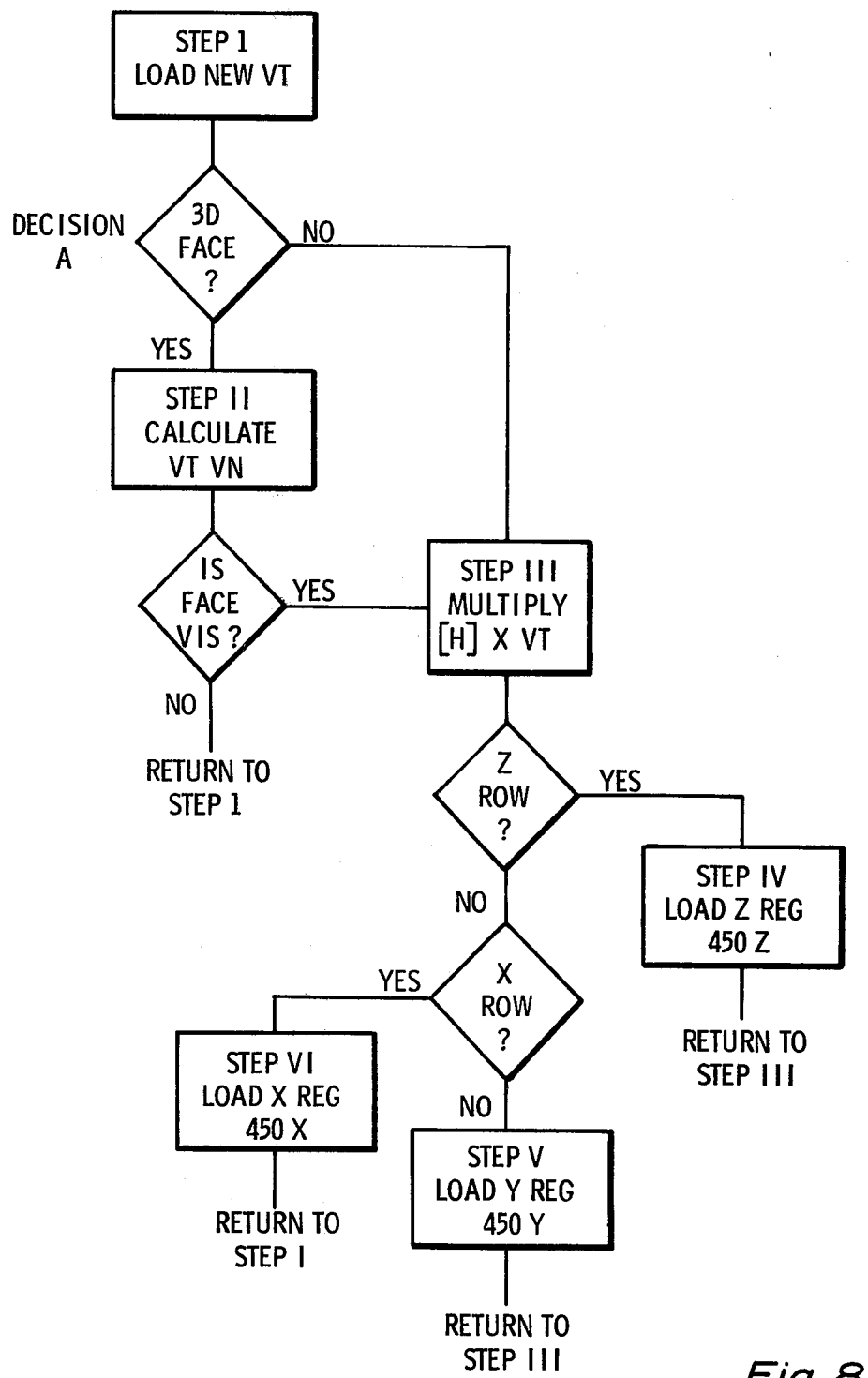
Fig_8A
ROTATION CONTROL

CLIPPING CONTROL

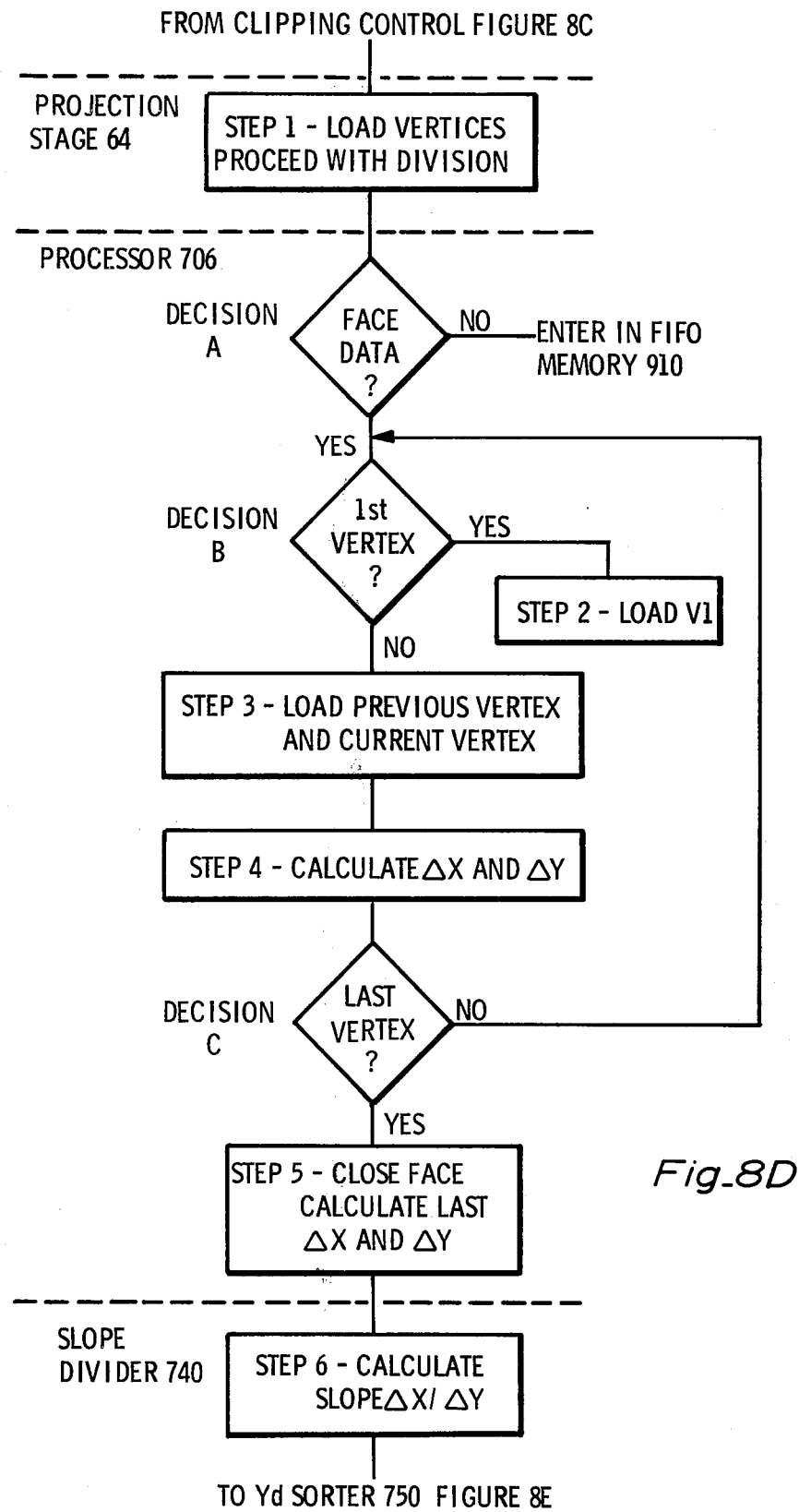
Fig_8D

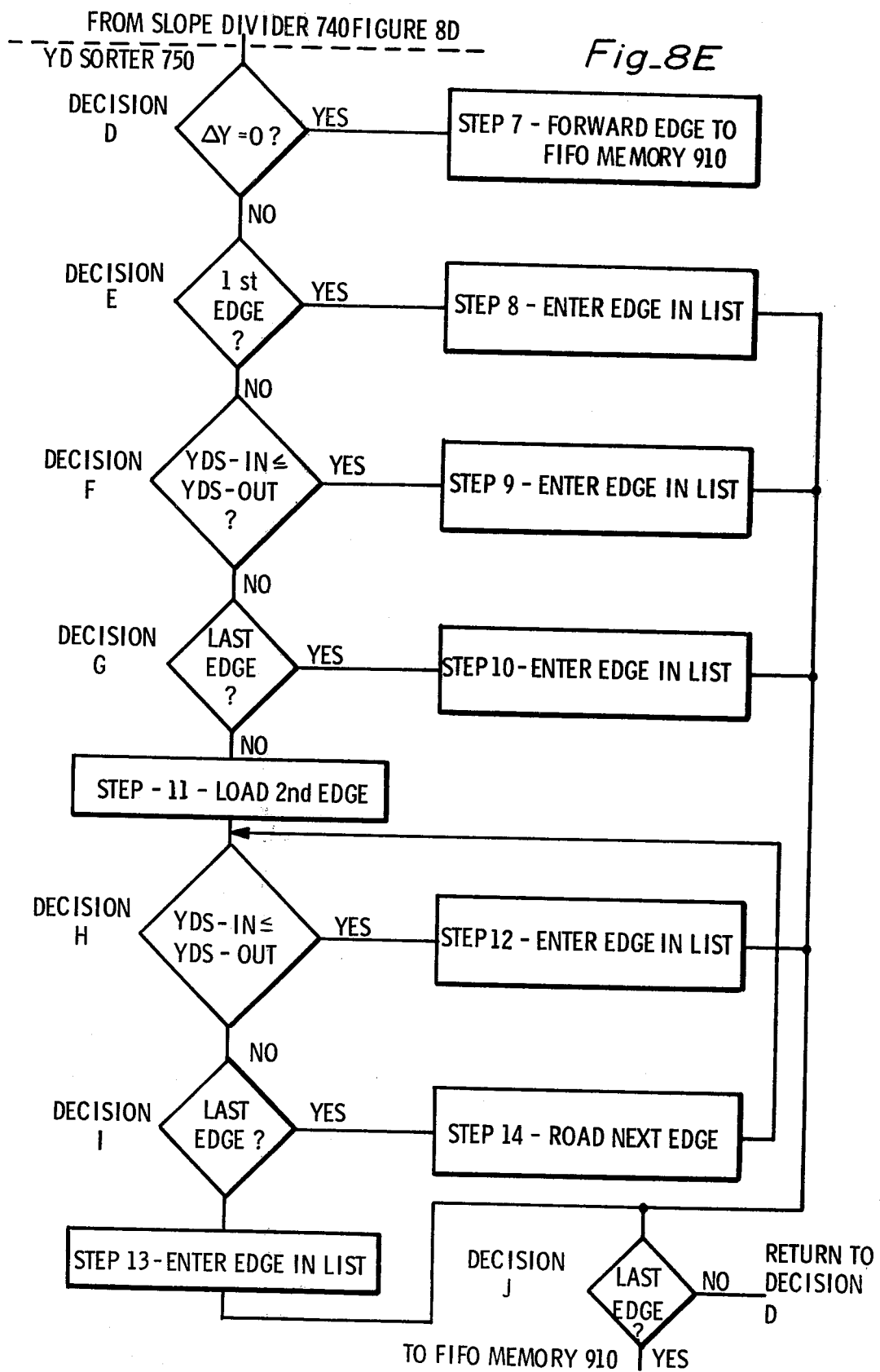

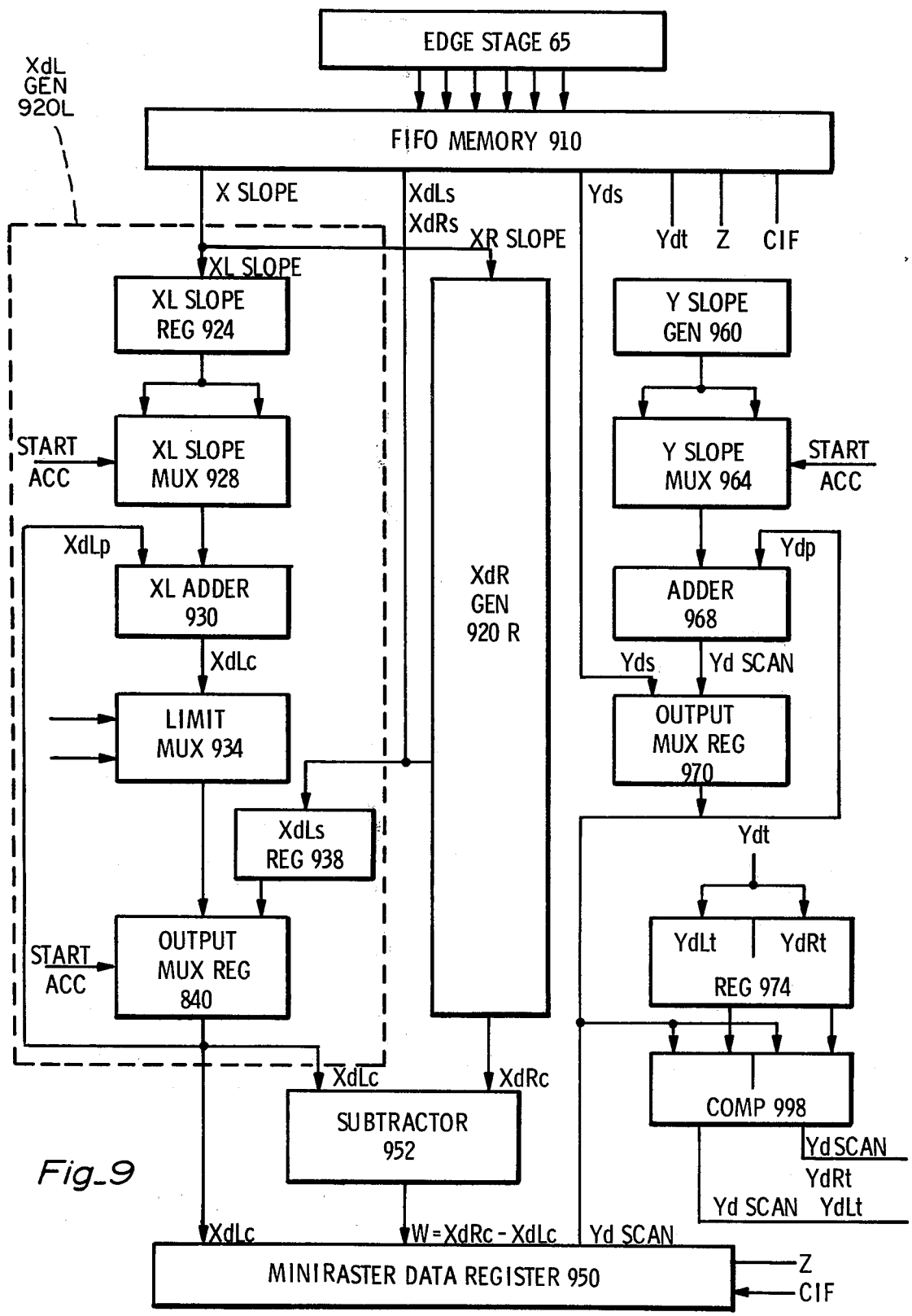
Fig_9

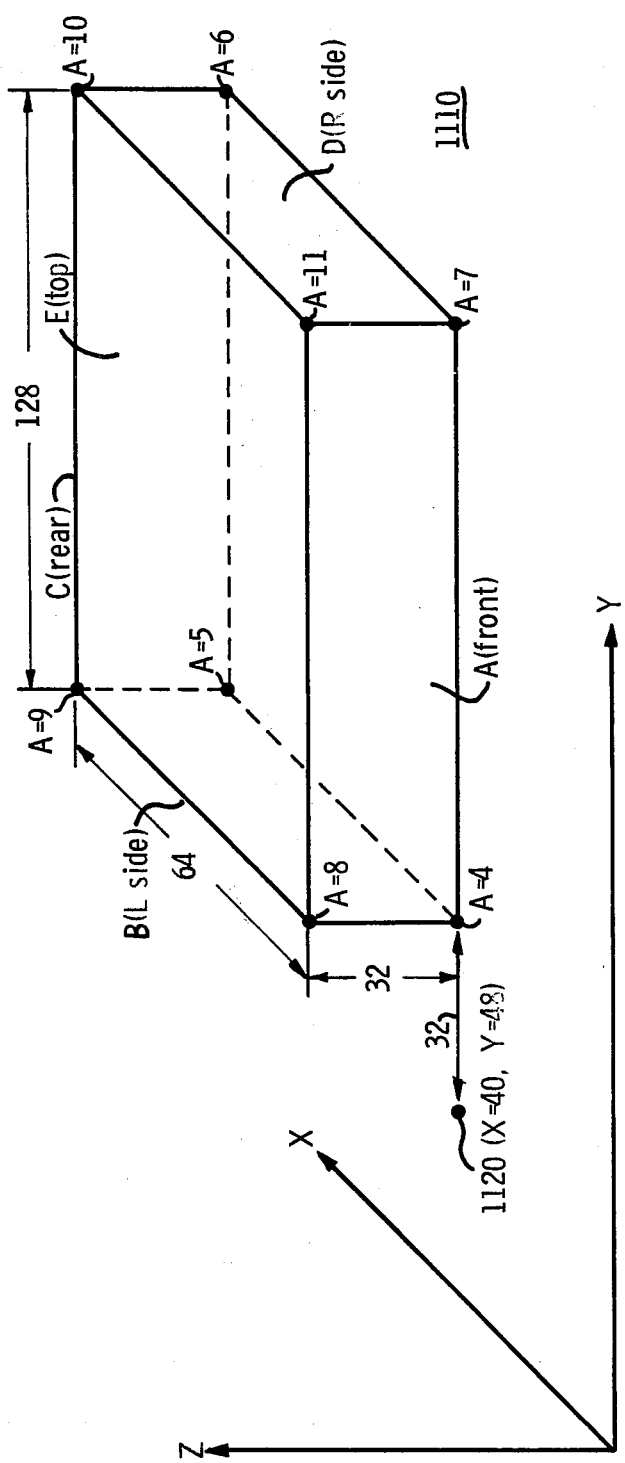

REPEATING PATTERN SIMULATION OF A POLYGON FACE OBJECT SYSTEM

BACKGROUND OF THE INVENTION

This invention relates to an imaging system for displaying objects formed of polygon faces as viewed from a maneuverable viewpoint, and more particularly to such an imaging system involving two-dimensional and three-dimensional objects formed by a series of identical equally spaced pattern units of faces.

DISCUSSION OF THE PRIOR ART

Heretofore, a series of fundamental shapes have been employed to generate the faces of the terrain data base as described in U.S. patent application Ser. No. 902,622 entitled "Scaling For Simulation of an Object System Formed by Polygon Faces of Fundamental Shapes and Dimension" filed on May 4, 1978, by David R. Marsh and assigned to the present assignee. In this prior system, the relative positions of the vertices of a series of standard sized shapes was stored in the terrain data base. Only the initial point (i.e., the first vertex) of each face was stored. The remaining vertices of each face were provided by scaling the appropriate one of the standard sized fundamental shapes to the desired size. Substantial data compression was effected by this prior art approach. However, each face had to be individually represented by an initial point in the terrain data base. This application relates to U.S. patent application Ser. No. 869,210, entitled "Real Time Simulation of a Face Object System as Viewed by a Moving Observer" filed Jan. 13, 1978 and assigned to the present assignee. Sections VI–XIV and FIGS. 2–9 of the present application are identical to the corresponding Sections and Figures of application Ser. No. 869,210.

SUMMARY OF THE INVENTION

It is therefore an object of this invention to provide a visual system for simulating a polygon face object system requiring a smaller data base and less data processing time.

It is yet another object of this invention to provide a high capacity-low cost polygon face visual system.

It is still another object of this invention to provide a polygon face visual system in which one pattern unit is repeated to form a series of pattern units.

It is a further object of this invention to provide a polygon face visual system employing data compression by format techniques.

DESCRIPTION OF THE FIGURES

Further objects and advantages of the present invention, and the operation of the visual system, will become apparent from the following detailed description taken in conjunction with the drawings, in which:

FIG. 4 is a block diagram of rotation stage 62 wherein each Vf is multiplied by an H matrix in;

FIGS. 8A to 8E are a logic diagram of processor control logic 70;

FIG. 9 is a block diagram of miniraster calculator 72 which provides the starting points and widths of each scan line;

FIGS. 10 and 11 show the layout of display scenes formed by two dimensional objects and three dimensional objects of various fundamental shapes and sizes;

GENERAL DESCRIPTION OF FLIGHT SIMULATION SYSTEM 10

Figure 1:
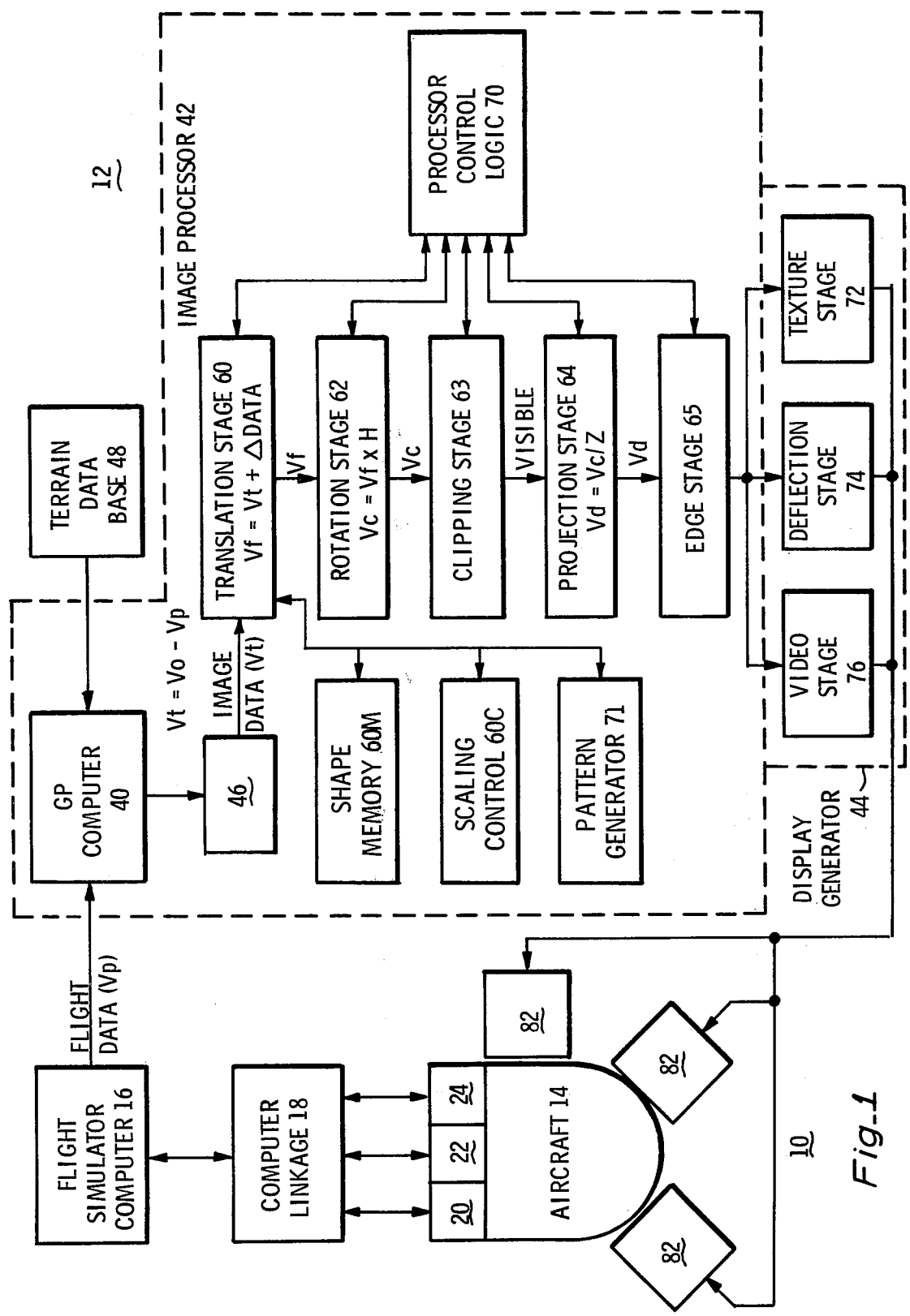
FIG. 1 is a block diagram of DIG visual system 10 and peripheral flight simulation equipment showing shape memory and scaling control.

FIG. 1 shows a flight simulation system 10 with visual capabilities provided by a digital visual system 12. A simulated aircraft 14 is linked to flight simulation computer 16 and visual system 12 through computer linkage 18. Flight computer 16 controls motion system 20 and instrument system 22 of aircraft 14 in response to the pilot's maneuvering action at aircraft controls 24. Visual system 12 is formed by image processor 42 and display generator 44. General purpose computer 40 (i.e., a PDP 11/35 from Digital Equipment Corporation) coordinates flight data and terrain data through interface controller 46 into translation stage 60 via a data buffer.

GP computer 40 receives flight data, such as aircraft position Vp, aircraft roll, pitch, and yaw attitude (H matrix), etc. from computer 16. GP computer 40 additionally receives terrain data (both natural formations and cultural structures) from data base 48 such as runways, towers, hangers, roads, rivers, fields, moving objects, etc. In general visual system 12 may process and display terrain features consisting of points, lines, closed convex polygons, or combinations thereof. Preferably the aircraft position data is an aircraft position vector Vp extending from the simulated position of aircraft 14 to the origin of the terrain coordinate system (see FIG. 2). In order to simplify conception and data organization, the terrain origin is preferably located proximate the touchdown area of the runway, and the x axis of the terrain coordinate system from data base 48 is coincident to the runway centerline. An updated Vp is supplied each frame period by flight simulation computer 16 as the flight parameters of aircraft 14 change. The earth data also includes initial positional data for certain landmark points or initial object points (Vo) such as the first vertex of each face, and the relative position of the points forming other terrain features (delta data). Translation stage 60 subtracts Vp from each Vo to form tranlated vectors (Vt=Vo−Vp). Translation stage 60 then combines the delta with the appropriate Vt to provide the remaining face vertex vector Vf for each face (Vf−Vt+delta data). Shape memory 60M contains the vertices of a series of fundamental shapes which may be adjusted in size by scaling control 60C to any dimension of a series of fundamental dimensions. The data associated with each face includes the position of the initial object point for that face, the address locations of the vertices of the fundamental shape for that face, and scaling data. The desired shape is retrieved from shape memory 60M and scaled to the desired size by scaling control 60C. Pattern generator 71 causes specified shapes to be repeatedly retrieved and scaled to form a pattern of identical equally spaced faces. Rotation stage 62 provides channel vectors Vc to clipping stage 63 which truncates vectors to the pyramid of vision. Data is then passed to projection stage 64 which projects the three-dimensional Vc into two-dimensional display coordinates or vectors Vd. Edge stage 65 provides a list of visible edges defined by the end points and the slope. The data flow through image processor 42 and the mode of operation thereof is controlled by processor control logic 70.

Texture stage 72 within display generator 44 receives the visible edge list for coordination with the display raster. Deflection stage 74 provides the required analog deflection voltages to CRT display devices 82. Video stage 76 receives the color, intrinsic intensity and size portion of the data for controlling the CRT beam voltage, current and focus.

DETAILED DESCRIPTION OF INTERFACE CONTROLLER 46 AND THE DATA FORMAT

GP computer 40 has an in-core, buffer memory which accumulates blocks of image data required to form each display frame. The in-core buffer contains initialization points (Vo) and delta data from data base 48 plus each new position vector Vp and rotational matrix (H) as they are computed by flight computer 16.

The image data accumulating in the in-core buffer is periodically transferred as a data block to hardware RAM buffer 304 in interface controller 46. Controller 46 processes the data words sequentially to image processor 42 while GP computer 40 simultaneously assembles the next data block in the in-core buffer for the next data handshake with RAM 304. The accumulation of data blocks in GP computer 16 and the handshake data transfer to RAM 304 is outlined in the following four operations:

Operation I—Preflight Load-Data Base 48 to Core Memory

Prior to each training flight, the content of data base 48 is loaded into computer 40 core-memory. Image data from data base 40 includes sixteen control words (0000–1111) having bit formats as described hereinafter, initialization data Vo, delta data, etc.

Operation II—Aircraft Orientation Update

The in-core memory is updated periodically with the most recent aircraft orientation angles roll, pitch and yaw (H matrix data) from flight computer 16. Preferably, this aircraft update occurs once each frame. The H matrix data is received by computer 40 as the sine and cosine of each of the three orientation angles—six items of data. The software of computer 40 responds to the orientation data to form the rotational matrix H described in the specification (Section IX). The software merely calculates the proper sine-cosine products to form a $3 \times 3$ matrix for each angle, and multiplies the three $3 \times 3$ matrices together to generate the nine elements of the rotational matrix H. These nine elements are generated each frame and inserted into RAM 304 at the proper place. The nine elements of rotational matrix H preferably occupy the lead position in the core-memory because the rotational perspective must developed by rotation stage 62 each frame prior to displaying any of the object faces on display 82.

Operation III—Aircraft Position Update

The core-memory update also includes the most recent aircraft position vector Vp which latter forms a series of translated vectors Vt in translation stage 60.

Operation IV—Handshake Between Core-Memory and RAM 304

As required the contents of the core-memory matrix are serially transferred to RAM 304 in interface controller 46, starting with the nine rotational elements.

The four above described operations involve simple software steps. Operations I, III, and IV are merely data transfer steps. Operation II involves forming a triple $3 \times 3$ matrix product, a mathematical operation which is well understood. Subroutines are available to execute this systematic multiplication.

FORMAT SUMMARY

The data format is formed by groups of data words which describe the nature and position of each object feature, and spaced instruction words for identifying the type of data in the immediately subsequent group of data words. The MSB bits of each instruction word are coded to define the particular instruction contained in the word, and the remaining bits concern the subsequent data. In the embodiment shown, a sixteen bit format is employed. The four MSB define the instruction and are decoded by processor control logic 70 to control the flow of data through image processor 42. The four LSB of each instruction word reveal the number of subsequent data words in the data word group to be processed under that instruction word. Each instruction word is loaded into registers 310A and 310B by control logic 70 in due course, and the immediately subsequent group of data words is loaded into RAM 350.

FIVE LOAD INSTRUCTIONS (0-4)

Each load instruction transfers point coordinates from buffer 306 into RAM 350 as follows:

```
           15    12 11   8 7 6   3 0
LDA (4)   |0 1 0 0|A A A|R R|B B B B|
```

Load A11 instruction causes the subsequent group of B sets of X, Y, Z coordinates to be stored in RAM's 350X, 350Y, and 350Z, beginning at address A. The first coordinate (one of two sixteen bit words) is stored in the RAM 350X, the second in the RAM 350Y, and the third in the RAM 350Z. This sequence is repeated until B sets of coordinates have been loaded starting at address A. R specifies the significance of the bits in the subsequent sixteen bit data words for coordinating the distribution thereof across the 24 bits of RAM's 350.

Normal 24 bit resolution (R=3) requires two subsequent data words. The first word provides the sixteen LSB to RAM's 350 and the second word provides the 8MSB to RAM's 350. Vp and Vo data require the full 24 bits and therefore are preceded by an LDA instruction word with R=3. The LSB of Vp preferably corresponds to ⅛ of an inch to eliminate detectable jitter of the scene from frame to frame. A new Vp is calculated by FS computer 16 each frame, and the round-off error in the LSB of Vp causes the entire earth coordinate system to jump a ground distance equal to the LSB. This interframe displacement (motion resolution) is minimized and rendered indetectable to the pilot trainee by providing aircraft position vector (Vp) resolution at the ⅜ inch level. The LSB of Vo is preferably small in order to accurately position detailed structure within a terrain feature (positional resolution). In the embodiment shown, Vo LSB also equals ⅜ inch because image processor 42 is already required to handle the ⅜ inch bit in order to prevent interframe displacement. That is, the position resolution may have the same value as the motion resolution as in the embodiment shown; but it is not required that the two resolutions be equal. However, a ⅜ inch Vo position resolution permits moving objects such as other airplanes and ground vehicles to be viewed without interframe displacement. The MSB of both Vp and Bo is 262,144 feet forming a cubic gaming volume in data base 48 which is 262,144 feet on an edge.

Fine 16 bit resolution (R=1) requires a single subsequent 16 bit data word of delta data which is entered into the 16LSB of 24 bit RAM's 350 (bits 16-23 are loaded with the sign bit 15). The MSB corresponds to 1024 feet (when LSB=⅜ inch). The fine 16 bit resolution may be used to process the vertices of small terrain faces (largest dimension less than 1024 feet) which is associated with high resolution detailed structure.

Coarse 16 bit resolution (R=2) requires a single 16 bit subsequent data word of delta data which is entered into the 16 MSB of 24 bit RAM's 350 (bits 0-7 are loaded with "0"s). The MSB=262,144 feet and LSB=8 feet. The coarse 16 bit resolution may be used to process the vertices of large terrain faces in which the dimensions have been rounded off to multiples of eight feet. While the size resolution of these faces is eight feet, they are positioned with the same resolution as the associated Vo.

```
                15    1211    8 7 6    3    0
LXY (3)        [0 0 1 1|A A A A|R R|   |B B B B]
```

Load XY instruction causes the subsequent group of B pairs of X and Y coordinates to be stored in the RAM 350X and RAM 350Y, beginning at address A. "0"s are stored in the corresponding addresses of the RAM 350Z. The data format is one or two 16 bit words of X data followed by one or two words of Y data. This sequence is repeated until B pairs of X-Y coordinates have been loaded into RAM's 350X and 350Y. The R codes are the same as for LDA.

```
LDX (0)        [0 0 0 0|A A A A|R R|   |B B B B]
```

Load X instruction causes the subsequent group of B X coordinates to be stored in the XT RAM 350X beginning at address A. Zeros are stored in the corresponding addresses of RAM's 350Y and 350Z.

```
LDY (1)        [0 0 0 1|A A A A|R R|   |B B B B]
```

Load Y instruction is the same as LDX except that the data is stored in RAM 350Y and "0"s are stored in the corresponding addresses in RAM 350X and RAM 350Z.

```
LDZ (2)        [0 0 1 0|A A A A|R R|   |B B B B]
```

Load Z instruction is the same as LDX except that the data is stored in the RAM 350Z and "0"s are stored in corresponding addresses of RAM's 350X and 350Y.

FIVE RECALL INSTRUCTIONS (5-9)

Recall instructions load the first vertice Vo of each face into RAM's 350 and initiates generation of the associated face.

```
                15        11    8 7 6    4 3    0
RCA (9)        [1 0 0 1|A A A A|R|S S S|B B B B]
```

Recall A11 instruction causes the single subsequent set of coordinates for the first vertice of a face, which typically is also an initialization vector Vo, to be loaded into the first location of RAM 350X, RAM 350Y, and 350Z. The other vertices of the current face have already been entered into RAM's 350 in CCW order as 16 bit coarse or fine data under one of the load instructions (0-4). These other B vertices are now recalled in CCW order from RAM's 350 beginning with address A of RCA. Normal 24 bit resolution (R=3) and coarse 16 bit resolution (R=2) have been previously described. S is a scale factor. When S=7, the current face is displayed full size. As S decreases the size of the current face is reduced by factors of 2.

```
RXY (8)        [1 0 0 0|A A A A|R|S S S|B B B B]
```

Recall XY instruction causes the single subsequent set of first vertice Vo coordinates to be loaded into the first address of RAM 350X and then the first address of RAM 310Y. RAM 350Z is unaffected. The face generation then proceeds as described under RCA.

```
RCX (5)        [0 1 0 1|A A A A|R|S S S|B B B B]
```

Recall X instruction causes the single subsequent X coordinate of the first vertice Vo to be loaded into the first address of RAM 350X. RAM's 350Y and 350Z are unaffected.

```
RCY (6)        [0 1 1 0|A A A A|R|S S S|B B B B]
```

Recall Y instruction causes the single subsequent Y coordinate of the first vertice Vo to be loaded into the first address of RAM 350Y; RAM's 350X and 350Y are unaffected.

```
RCZ (7)        [0 1 1 1|A A A A|R|S S S|B B B B]
```

Recall Z instruction causes the single subsequent Z coordinate of the first vertice Vo to be loaded into the first address of RAM 310Z; RAM's 350X and 350Y are unaffected.

RCL (10) | 1 0 1 0 | A A A A | R | S S S | B B B B |

Recall Load instruction does not load any new data into RAM's 350 but is the same as RCX in other respects. RCL is used to hold te previous Vo in order to construct another face contiguous with or proximate to the previous face using the previous Vo as the first vertice or a landmark point for establishing the position of the vertices of the contiguous face.

OTHER INSTRUCTIONS

CIF(11) | 15 | 12 11 10 | 9 8 | 4 3 | 0 |
       | 1 0 1 1 | SEL AXIS | S± | I I I I | B B B B |

Color Intensity Flag instruction is followed by B additional words, i.e.,

CIF1 (B=1) | 15 | 8 7 6 5 | 4 3 | 2 1 0 |
           | Spares | OBJ CODE | FB | IOS | VER RES |

CIF2 (B=2) | 15 | 10 9 | 4 3 | 2 1 0 |
           | Color− | Color+ | Col Sel | Spares | which define the visual characteristics of each data base feature (face, line, or point). The visual characteristic of certain cultural objects such as signal beacons and runway lamps are a function of viewing direction and require directional data. SEL AXIS identifies the viewing axis to which the CIF data pertains:

SEL AXIS=00: the color and intensity of the object is uniform in all direction—ordinary object.
SEL AXIS=01: the color of the object depends on the direction of viewing along the X axis—bidirectional object.
SEL AXIS=10: bidirectional along Y axis.
SEL AXIS=11: birdirectional along Z axis.

S± (SIGN±) identifies the direction of view of the object along the axis identified by SEL AXIS. COLOR+ identifies the color of the object when viewed from the S+ direction, and COLOR− identifies the color of the object when viewed from the S− direction. COL SEL permits ordinary non-direction features to be displayed in a color from COLOR+ (COL SEL=0) or from COLOR− (COL SEL=1). I (INTENSITY) determines the intensity of the data base feature. When only an intensity change is required to display the current object, only CIFO (B=0) is employed. OBJ CODE identifies the type of object to be recalled:

OBJ CODE = 000: 3 dimensional face (a face having a vertical component). Most 3D faces form part of a 3 dimensional object such as the side or top of a building.
= 001: Spare.
= 010: Spare.
= 011: Face to line, such as runway stripes which narrow down to a line with distance.
= 100: Sky.
= 101: Line.
= 110: Light point.
= 111: 2 dimensional face, a completely horizontal face in the X-Y plane.

Figure 2:
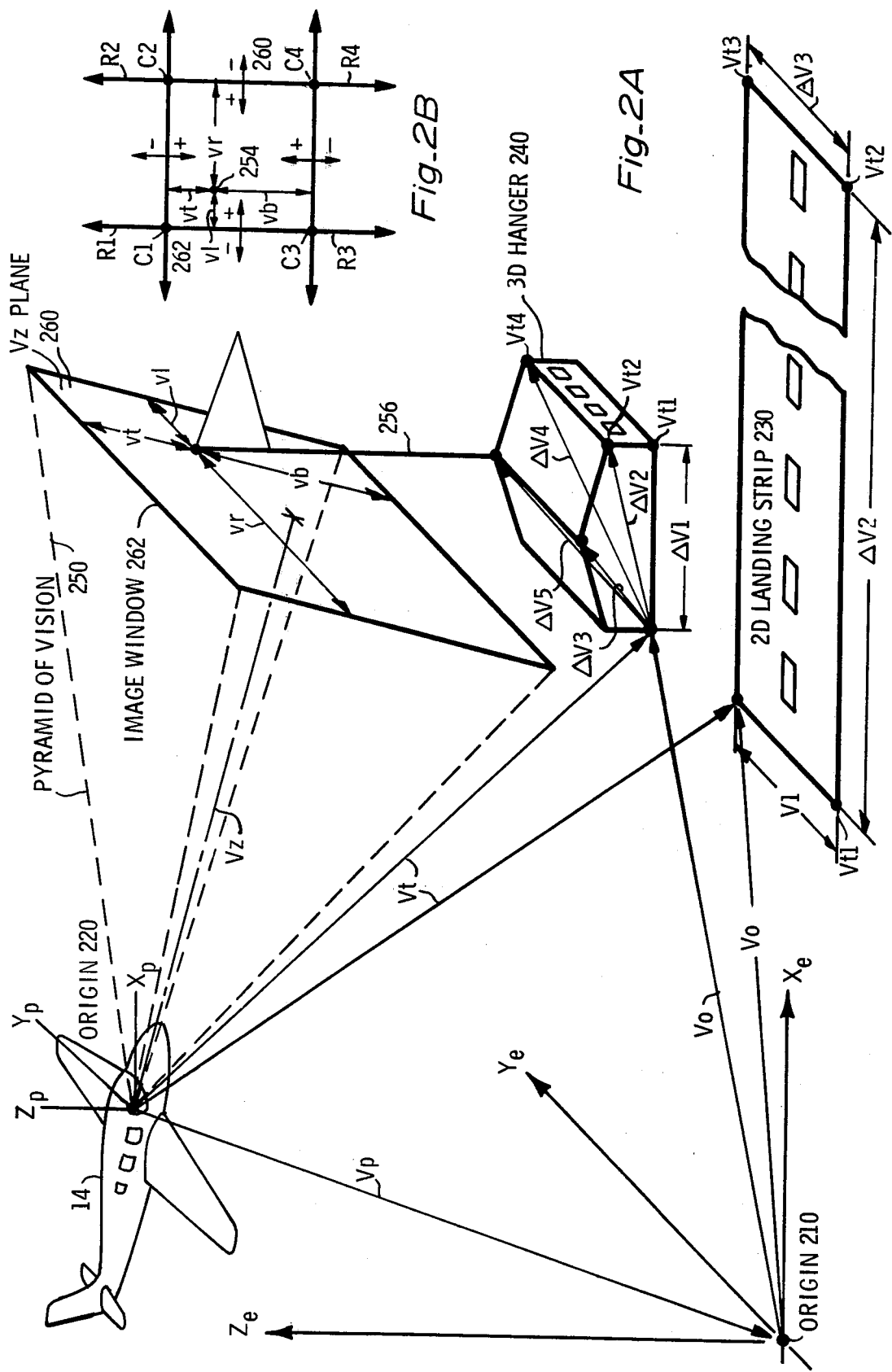
FIG. 2a is a pictorial representation of an aircraft and several terrain features illustrating the image vectors.
FIG. 2b is a diagram showing outcoding regions.

The use of Recall instruction as illustrated in FIG. 2a is different for two dimensional faces on the X-Y ground plane (which always face the observer) and faces of a 3 dimensional object (which are sometimes occluded), as illustrated in FIG. 2. Two dimensional faces are identified by a 2D face object code in the previously loaded CIFI data. RCX computes the vertices of each face by starting with the X, Y, Z coordinates of Vo stored in the first address of RAM's 350 and combining additional vector coordinates from RAM's 350 starting at address A. B is the number of vertices in the face, and, since Vo is the first vertex, B-1 additional vectors (Delta V1, Delta V2, . . . Delta VB-1) are required to generate the other vertices. The vertices are always stored and retrieved in counter-clockwise order. Three dimensional faces are identified by a 3D object code. Vo is not used as a vertex for 3D faces, so that B additional vectors (Delta V1, Delta V2, . . . Delta VB) are required to display a face having B vertices. The RAM addresses containing the additional vector coordinates for 3D faces are provided by one or two data words 3DV1 and 3DV2 following the X data word or words. Each additional vector in 3D recall describes the position of a vertex with respect to Vo as opposed to a 2D recall, in which each additional vector describes the position of a vertex with respect to the previous vertex. The address format for additional 3D vectors in RAM 350 is V1 | 15 VR | VR | VR | VR 0 |
   | D D D D | C C C C | B B B B | A A A A | first word V2 | 15 VR | VR | VR | VR 0 |
   | H H H H | G G G G | F F F F | E E E E | second word If the face has four or fewer vertices, only the first word is used. The order in which the RAM 350 addresses are used is reverse alphabetical. For example, when recalling a face having five vertices, the first vertex will be computed using the vector stored at E. The last vertex is always stored at A. A in the RCX instruction is also the address of the normal vector stored in normal RAM 440N. The normal vector is used to test the visibility of a face and must have been previously loaded in normal RAM 440N using a LDN instruction (described hereinafter). Scale factor is the same for a 3D face as for a 2D face.

FB identifies data fed back for CRT correction to eliminate ballistic nonlinearities and provide a true display.

IOS identifies data displayed on the instructor's monitor 28 only.

VER RES determines the scan line density (vertical display resolution in horizontal lines per vertical scan).

VER RES = 000: 128 lines low resolution for rapidly painting structureless large areas such as the sky with a defocused electron beam.
= 001: 256
= 010: 384
= 011: 512
= 100: 640
= 101: 768
= 110: 896
= 111: 1024 lines high resolution for painting detailed objects

LCD(15) | 15 12 | 11 8 | 7 0 |
        | 1 1 1 1 | | C C C C C C C C |

Load Correct Data instruction enters C vertices with corrected CRT coordinates.

STG(12) $\underset{15}{\boxed{1\ 1\ 0\ 0\ |A\ A\ A\ A\ |C\ C\ C\ C\ C\ C\ C\ C}}$ Control String instruction causes the display of string of C equally spaced lights or four-sided two dimensional faces, depending on the CIFI OBJ CODE. The first light of a string is displayed at the Vo+A position and a spacing vector stored at A+1 is used to fix the position of the second light and all successive lights until C lights have been displayed. The first vertex of the first face of a string of faces is displayed at the Vi+A position and the other three vertices are found successively adding the vectors stored at RAM's 350 addresses A+1, A+2, and A+3. The vector stored at A+4 locates the first vertex of the next face with respect to the last vertex of the current face.

LDH(13) $\underset{15\ \ \ 12\ \ \ \ \ \ \ \ \ \ 8\ 7\ 6\ 5\ 4\ 3\ \ \ \ \ \ \ \ \ \ 0}{\boxed{1\ 1\ 0\ 1\ |A\ A\ A\ A\ |0\ \ \ \ |C\ C\ |B\ B\ B\ B}}$ Control Load H instruction loads the H rotation matrix on data bus 307 into RAM 410H in rotation stage 62. The elements of the rotation matrix are in 16 bit 2's complement form, and each address of RAM 410H will store three elements. The rotation matrix multiplies the translated X, Y, and Z coordinates in the following form:

$$\begin{bmatrix} h11 & h12 & h13 \\ h21 & h22 & h23 \\ h31 & h32 & h33 \end{bmatrix} \begin{bmatrix} XT \\ YT \\ ZT \end{bmatrix} \begin{bmatrix} XR \\ YR \\ ZR \end{bmatrix} \begin{matrix} = h11\ XT + h12\ 1/T + h13\ ZT \\ = h21\ XT + h22\ YT + h23\ ZT \\ = h31\ XT + h32\ YT + h33\ ZT \end{matrix}$$

The element data follows the LDH instruction in the following order:

h31, h32, h33, h21, h22, h23, h11, h12, h13.

The matrix is always stored in the first three addresses of RAM 410H, so A=0, the initial address and B=3, the number of matrix rows. C is the channel number associated with rotation matrix.

LDN(14) $\underset{15\ \ \ 12\ \ 11\ \ \ \ 8\ \ \ 7\ 6\ \ \ 3\ \ \ \ \ \ 0}{\boxed{1\ 1\ 1\ 1\ |A\ A\ A\ A\ |1\ |\ \ \ \ |B\ B\ B\ B}}$ Control Load N instruction loads B face normal vectors on data bus 307 into normal vector RAM 440N in rotation stage 62, starting at address A. Each vector consists of three 16 bit data words in order Nx, Ny, Nz. The Control Load N will therefore always be followed by three B words of data. Each address in normal RAM 410N is associated with a three dimensional face of identical address in RAM's 350. Both RAM's are addressed during the Control Recall of a 3D face.

DETAILED DESCRIPTION OF DIGITAL VISUAL COMPUTER 12

Each stage of digital visual system 12 is shown in detail in FIGS. 3 through 9. Preferred embodiments are disclosured at the detailed logic level. Each component is described by function, input-output characters, or conventional nomenclature to enable one skilled in the arts of simulation, digital design, and computer programming to practice the invention. The components are additionally designated by the manufacturer's IC type number from the following integrated circuits data books:

Texas Instruments Incorporated "The TTL Data Book of Design Engineers" First Edition, Copyright 1973

National Semiconductor Corporation "Digital Integrated Circuits" January 1974

Advanced Micro Devices Inc. "Advanced Micro Devices Data Book" Copyright 1974 unless otherwise specified. Further, may inverters are employed throughout CDIG system 10 for buffering signals with multiple loads. These buffer inverters are type 74S04 unless otherwise stated.

TRANSLATION STAGE 60

General Operation

Figure 3:
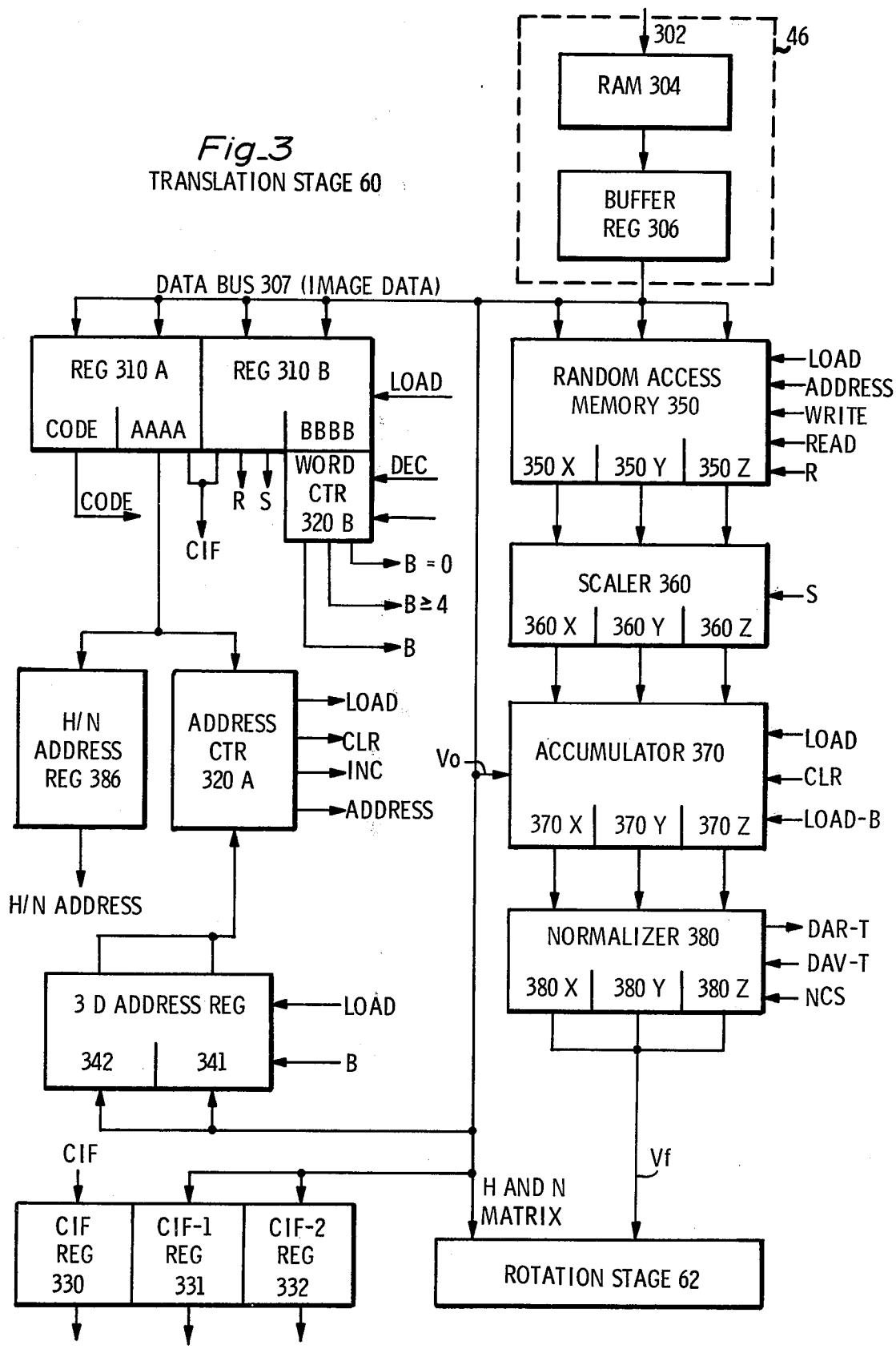
FIG. 3 is a block diagram of translation stage 60 wherein the delta data is translated into face vertex vectors Vf.

FIG. 3 shows translation stage 60 of image processor 42 and a portion of controller 46. Controller 46 receives image data in sequential order from computer 40 at input 302 of random access memory 304. The image data is arranged in data blocks M bits wide and N words long, which in the embodiment shown is 16×1024. RAM 304 periodically handshakes with a core memory in GP computer 40 to reproduce each block of data. Image data is sequentially transferred from RAM 304 through a buffer register 306 to image data bus 307 in response to load pulses from interface controller 46.

Each instruction word on bus 307 is loaded into instruction registers 310 A and B which forwards the code bits (four MSB's) to control logic 70. Control logic 70 then selectively activates the remaining blocks of translation stage 60 for processing the subsequent B words of data appropriately. Load instructions (0-4) cause control logic 70 to send WRITE to RAM's 350, which then writes the subsequent B data words starting at ADDRESS A. Counter 320A increments ADDRESS A while counter 320B decrements down from B. When the B count expires, B=0 is forwarded to logic 70 and the next instruction is loaded into instruction registers 310.

Vp is loaded into RAM's 350 by a Load A instruction (R=3) immediately after each handshake, and Vp is always positioned at the same address (address 1). Next, B words of delta data vectors is entered by another load instruction.

Recall instructions (5-9) load the Vo associated with the previously loaded B words of delta data. Each Vo is positioned at the same address in RAM 350 (address 0). The recall instruction causes control logic 70 to forward READ to RAM's 350, and the B words of delta delta are recalled from RAM's 350 and processed through the remainder of translation stage 60.

CIF instruction causes control logic 70 to forward LOAD to CIF register 330 to receive SEL AXIS, SIGN±, and Intensity data from instruction registers 310. B subsequent data words are entered into CIF-1 register 331 and CIF-2 register 332 where the CIF data is temporarily held. The CIF data is advanced into corresponding CIF registers 460 in rotation stage 62 as Vf data enters rotation stage 62 from normalization register 380.

Three dimensional vertex registers 341 and 342 receive the addresses of vertices of 3D faces in RAM 350. The addresses in registers 341 and 342 address RAM's 350 via address counter 320A.

RAM's 350 write image data from interface controller 46 after load instructions and read image data after recall instructions. RAM's 350 temporarily store Vp and delta V's until the associated Vo is entered permitting the faces to be generated.

Scalers 360 (X, Y, and Z) control the size of the displayed image by expanding or contracting the X, Y, and Z position coordinates by factors of two. S data from register 310B shifts the binary decimal point to effect the scaling.

Accumulators 370 receive the X, Y, and Z position coordinates and perform the following translation computations (illustrated in FIG. 2):

basic translation: from the origin 210 of data base coordinate system to the origin 220 of aircraft 14 coordinate system Vp+Vo=Vt 2D translation: from initial vertex to the remaining vertices sequentially-cumulative (landing strip 230)

Vt+Delta V1=Vt1
Vt1+Delta V2=Vt2
Vtn+Delta (Vn+1)=V(tn+1)

3D translation: from initial vertex to each remaining vertex separately-non cumulative (hanger 240)

Vt+Delta V1=Vt1
Vt+Delta Vn=Vtn

Normalization registers 380 (X, Y, and Z) loads the translated vertices Vt, and left shifts leading zeros (or ones for negative Vt's) in response to control logic 70. The first difference between the MSB and the second MSB in any of the normalization registers 380 generates a normalization complete signal, (NCS), back to control logic 70. Normalization complete in any of the normalization registers 380 stops the normalization process of all the registers insuring that the normalized points maintain consistent dimension units and remain on the same line of vision as viewed on display 82. Normalization has the advantage of reducing the 24 bit input image data into bits of normalized image data by eliminating either leading zeros (or ones for negative numbers). The data load is reduced to 66% with negligible loss in position resolution.

DETAILED DESCRIPTION

RAM 304 may be formed by a 16 bit×24 word RAM (sixteen 93415's, Fairchild) for holding the block of image data from GP computer 40.

Buffer register 306 may be formed by a 16 bit register (four 74S175's) followed by buffer inverters as required (74S04).

Register 310A may be an eight bit register (two 74S175's) for receiving four bits of code (4MSB) and four bits of RAM address (4LSB).

Register 310B and word counter 320B may be formed together by an eight bit down counter (two 74S163) for receiving the compliment of B and counting to 15. At B compliment=15, B=0 appears on the carry out terminal.

Address counter 320A may be a 2:1 inverting multiplexer (74S158) followed by a four bit up counter (one 74S163). During load and recall instructions, counter 320A increments the start address AAAA to RAM's 350. While processing three dimensional faces counter 320A processes the face vertex address in three D registers 341 and 342.

CIF register 330 may be an eight bit register (two 74S175) for receiving eight bits of SEL AXIS, S± and Intensity Data from the CIF Load instruction.

CIF-1 and CIF-2 registers 331 and 332 may be 16 bit registers (four 74S174) for receiving two 16 bit words of CIF data immediately following the CIF instruction.

Three dimensional registers 341 and 342 may be eight 4 bit tristate registers (eight 8551) preceded by a 3 line to 8 line decoder (one half 74S139) which enables one of the eight tristate registers in response to the three LSB's of B from word counter 320B.

RAM 350X may be a 24 bit RAM (six 74S189's) to accomodate the 24 bits of X coordinate image data. The 24 bit RAM is preceded by a 2:1 8 bit multiplexer (two 74S158) between a pair of true compliment zero one elements (two 74H87's each). During 16 bit fine resolution (R=1) the right hand zero one element forwards the 8LSB's of the image data to the 24 bit RAM, and the righthand zero one element enters all zeros (or all ones depending on the sign of the image data). During 16 bit coarse resolution (R=2) the right hand zero one element enters all zeros and the lefthand zero one element forwards the 8 MSB's.

Scaler 360x may be formed by a flow through right shifter device (twelve 25S10's AMD) in response to S data from register 310B counter.

Accumulator 370x may be a 24 bit adder (six 74283's) for receiving data at the A input, followed by a 24 bit return register (six 74S175's) which outputs to the B input. Vp is processed through the adder and return register, and returned to the B input. Vo is loaded at the A input and added to Vp to form Vt and returned to the B input. Delta data is then loaded at the A input and added to Vt to form the remaining vertice vectors Vf1-Vfn, which are advanced through the return register to a 24 bit buffer register (four 74S174's) where the Vf's are held until normalizer 380x is free.

Normalizer 380x may be formed by a 24 bit shift register (three 74199) plus a Buffer register (four 74S174's) which holds the normalized Vf's until rotation stage 62 is free to handle the next Vf.

ROTATION STAGE 62

General-H Matrix

Figure 4:
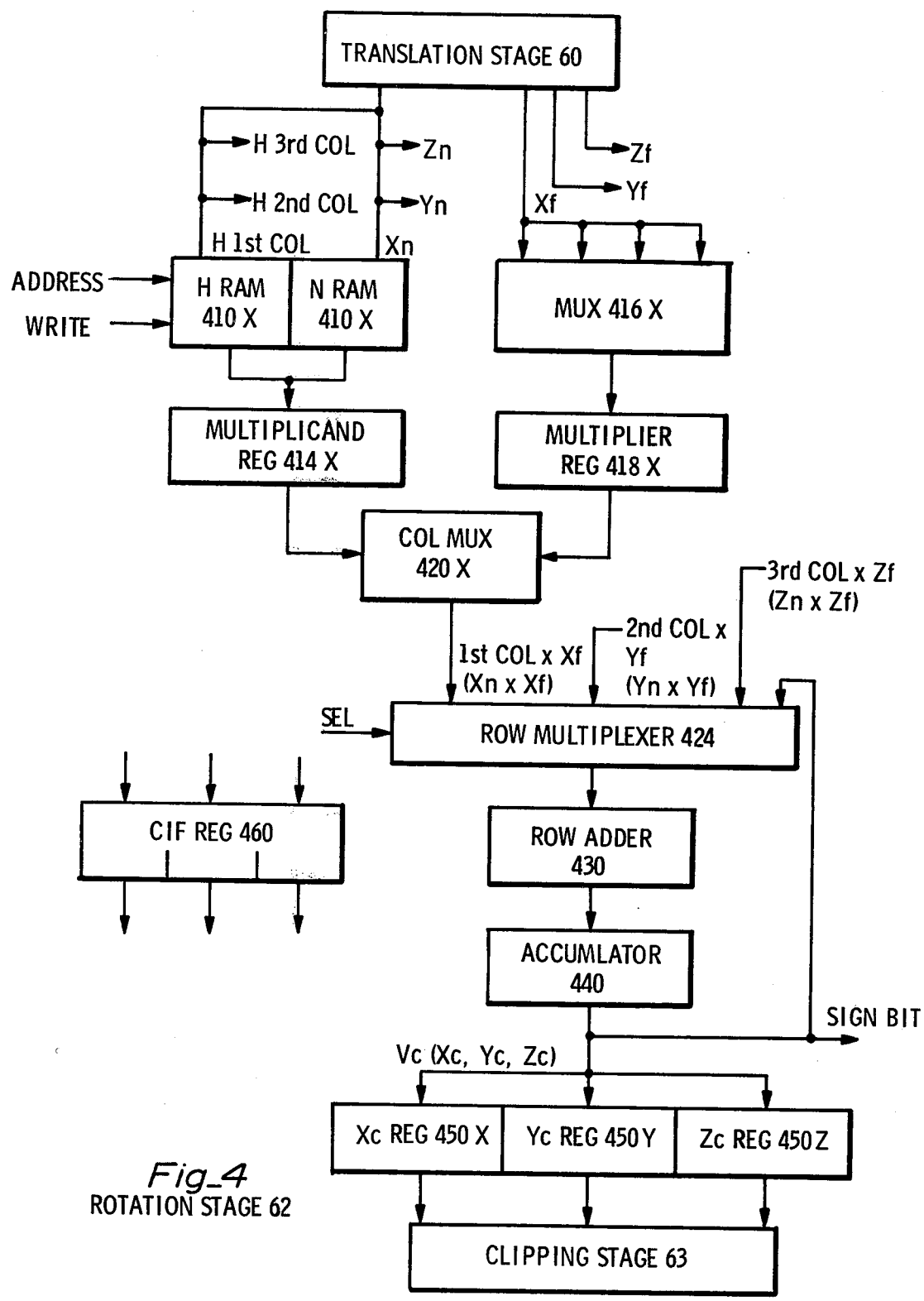

FIG. 4 shows rotation stage 62 of image processor 42 which multiplies the translated point vectors Vf1-Vfn from translation stage 60 by the rotation matrix H provided on data bus 307 to produce a rotated or channel vectors Vc (XcYcZc):

| Xc | Xf |
|---|---|
| Yc = [H] | Yf |
| Zc | Zf |

Each channel corresponds to the perspective view from one window of aircraft 14.

The rotation matrix H is developed from yaw (Y, left), pitch (P, down), and roll (R, right) motions by flight simulator 16 using conventional software. The order of rotation is Y followed by P, and the matrices for the separate rotations from translated to rotated pilot eye or channel coordinates are as follows:

$$HY = \begin{bmatrix} \cos Y & \sin Y & 0 \\ -\sin Y & \cos Y & 0 \\ 0 & 0 & 1 \end{bmatrix}$$

-continued $$HP = \begin{bmatrix} \cos P & 0 & -\sin P \\ 0 & 1 & 0 \\ \sin P & 0 & \cos P \end{bmatrix}$$

$$HR = \begin{bmatrix} 1 & 0 & 0 \\ 0 & \cos R & \sin R \\ 0 & -\sin R & \cos R \end{bmatrix}$$

The composite matrix H describing this rotation is given by the matrix product:

[H] = [HR][HP][HY] = 3 columns × 3 rows matrix

The aircraft attitude matrix H is constant for each frame and is therefore computed only once per frame for each channel.

The three elements of the first column of the H matrix are entered into H RAM 410x by WRITE from control logic 70 immediately subsequent to the Load H instruction. The first column is then multiplied by the Xf coordinate of each of the translated vector series Vf1-Vfn in turn within column multiplier 420X. The three elements of the second and third columns of [H] are similarly entered into H RAM 410Y and 410Z (not shown). The nine products generated above are combined into Xc, Yc, and Zc by row multiplexer 424 and adder 430. The resulting Vc is forwarded to clipping stage 63.

GENERAL-VISIBILITY TEST

The rotation circuitry also provides the multiplication for the dot product visibility test for the faces which form three dimensional structures such as buildings:

Vt dot Vn = M cosP where:
Vt is the translated vector extending from aircraft 14 to the first vertex of the face being tested; and Vn is the vector normal to the face being tested.

When cosP is negative, P is greater than 90° and the face is visible because the face is on the front or exposed side of the building. When cosP is positive, P is less than 90° and the face is invisible because the face is on the back side of the building. The sign bit of the dot product is employed for back side elimination, a simple occulting technique.

The Xn, Yn, and Zn coordinates of Vn are entered into N RAM's 410X, Y, and Z respectively immediately subsequent to the Load N instruction. Each coordinate is multiplied by the corresponding coordinate Xt, Yt, and Zt of Vt in multipliers 420 and the sign bit of the resulting quantity is forwarded to control logic 70.

DETAILED DESCRIPTION

H RAM 410x may be a 16 word by 16 bit sequential access memory (four 74S189's) for holding the three words in the first column of the 3×3 H matrix and providing 13 spare 16 bit addresses. WRITE and ADDRESS are provided by control logic 70.

N RAM 410x may be a 16 word by 16 bit random access memory (four 74S189's) for holding up to sixteen words of Xn which accomodates a three dimensional complex structure with up to sixteen faces.

Multiplicand register 414x may be a 16 bit buffer register (four 74S175's) for holding the current output of H and N RAM's 410x available to multiplexer 420x while the next address in RAM's 410x are accessed.

MUX 416x may be a 16 bit dual 4-1 multiplexer (three 74S153's) for providing four bits of output plus carry over bit.

Multiplier register 418x may be a 5 bit buffer register (one 74S174) for holding the output of MUX 416x available to multiplier 420x.

Column multiplier 420x may be formed by eight AM 25S05's (Advanced Micro Devices in 16 bit×4 bit configuration) followed by a buffer product register (three 74S175's) and operates as described in connection with Multiplier 330 in U.S. Pat. No. 3,996,672 which issued Dec. 14, 1976.

Row Multiplexer 424 may be a 20 bit 4 to 1 multiplexer (ten 74157's) connected in parallel) which sequentially select the first row elements of each column for summing in row adder 430 to form Xc. The second and third row elements are likewise summed to provide Yc and Zc.

Row adder 430 may be a 20 bit adder (five 74783's) for summing the row products of the H matrix.

Accumulator 440 (three 74174's) returns intermediate sums to multiplexer 440 which are required in forming Vc.

Buffer registers 450 may be 18 bit registers (four 74175's) for holding Vc (Vx, Vy, Vz) prior to clipping.

CIF register 460 may be a 40 bit register for holding the CIF data from CIF registers 330, 331, and 332.

CLIPPING STAGE 63

General

Figure 5:
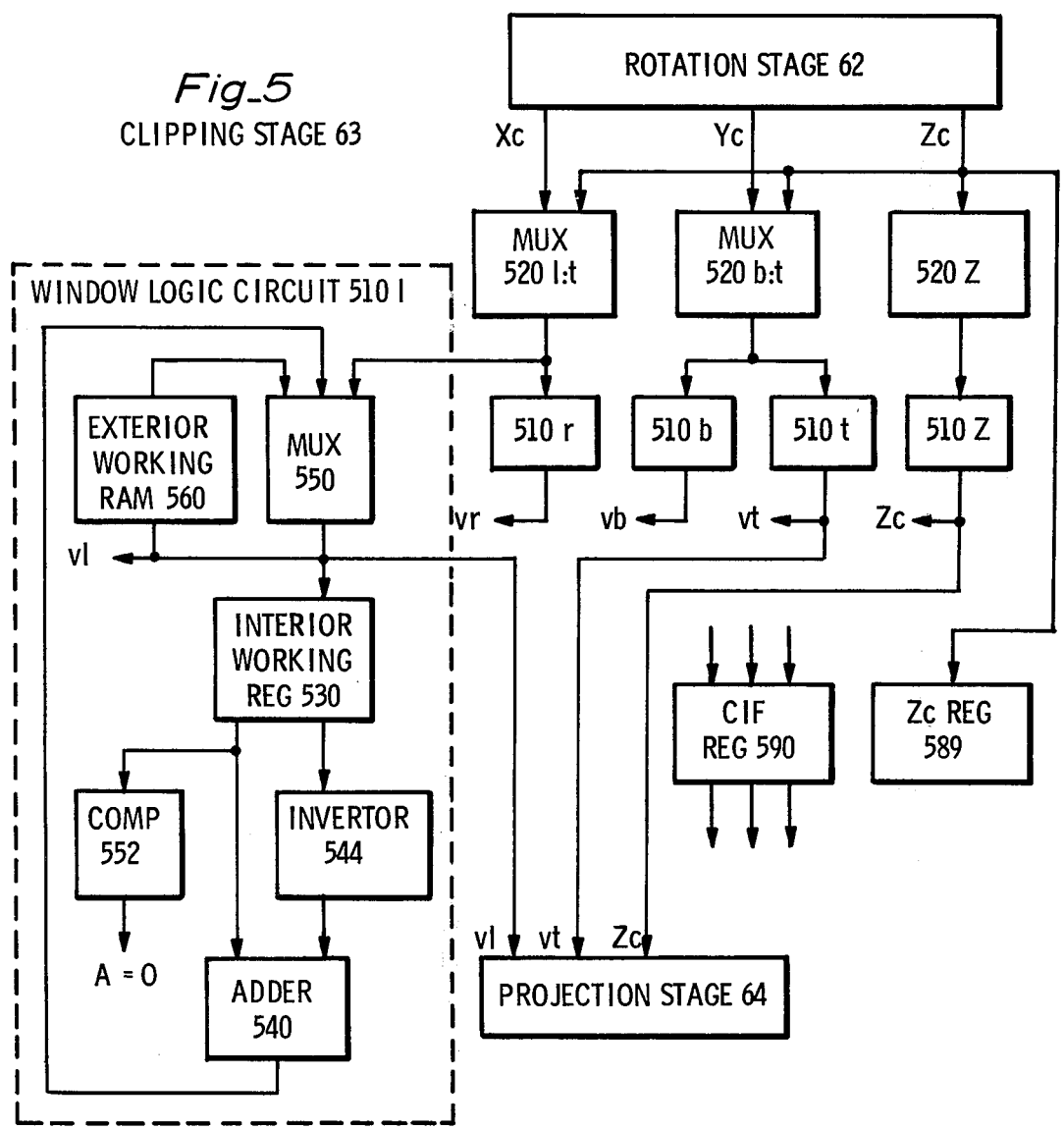
FIG. 5 is a block diagram of clipping stage 63 which eliminates image data outside the field of vision.

FIG. 5 shows clipping stage 63 which eliminates points outside the viewing volume or pyramid of vision 250 shown in FIG. 2a. Pyramid of vision 250 has its vertex at the eye of the pilot (origin 220). The viewing volume in the embodiment shown is four sided, bounded by four planes defined by the four sides of the aircraft window.

Clipping is accomplished at the object face level. Vertices defining each face edge are processed in sequence through clipping stage 63 to determine whether the face is:

Case A—face completely within view,
Case B—face partially within view, or
Case C—face completely out of view.

Faces which are only partially in view (Case B) are intercepted by the sides of pyramid of vision 250. In the process of clipping, Case B faces are modified by the addition of new edges. The result is a modified closed polygon face that is completely within pyramid 250.

The position of any point or vertex relative to pyramid of vision 250 is defined by the distance of that vertex from each of the four sides of pyramid of vision 250. Referring to FIG. 2a point 254 forming the top of the flag pole 256 is positionally defined by the four window coordinates vl, vr, vb, vt in Zc plane 260. These window coordinates are calculated as follows:

vl = Kl Z + X vr = Kr Z − X vb = Kb Z + Y vt = Kt Z − Y where the K's are constants associated with the vertex angles of pyramid 250. For a square pyramid of vision having equal vertex angles A, Kl = Kr = Kb = Kt = Tan (A/2). A point is inside the truncated pyramid of vision 250 if vl≦0, vr≦0, vb≦0, vt≦0, and Zc >0.

The above window coordinates are calculated from Vc by window logic circuits 510-l, 510-r, 510-b, 510-t, and 510-z shown in FIG. 5 (only 510-l is shown in detail). Window ciruit 510-l receives Xc and Zc from l:r multiplexer 520 for temporary storage in interior working registers 530. Adder 540 and inverter 544 cooperate to perform the required addition. Window coordinates vl and vt are forwarded to projection stage 64 to become display coordinates Xd and Yd, and Zc is forwarded for range attenuation effects.

The signs of the window coordinates are combined in a single five-bit out-code (OC):

OC=sign l, sign r, sign b, sign t (and sign Z) where the sign of each window coordinate is "0" for positive and "1" for negative. The origin of each window coordinate is the corresponding boundary of image window 262 with the negative direction extending away from image window 262 (see FIG. 2b, left for vl, right for vr, down for vb, and up for vt). The positive direction for each window coordinate is toward the center of image window 262. The four boundaries of pyramid 250 subdivide the position half-space in front of aircraft 14 into nine regions. The out-code of each Vc identifies the region in which the point or vertex is located. The out-code for each region of the two-dimensional projection of pyramid 250 is shown in the following table:

| upper left region | upper region | upper right |
|---|---|---|
| 1001 (0) | 0001 (0) | 0101 (0) |
| left region | visible region window 262 | right region |
| 1000 (0) | 0000 (0) | 0100 (0) |
| lower left region | lower region | lower right region |
| 1010 (0) | 0010 (0) | 0110 (0) |

The relative position of any face edge to pyramid 250 can be found by examining the outcodes of the end points of the edge. If both vertices are behind the Zc=0 plane (that is behind the pilot's eye where Zc is negative), then sign Z(1)=sign Z(2)=1 and the face edge is not visible and can be rejected. If both vertices are in front of the Zc=0 plane (in front of the pilot's eye where Zc is positive), then sign Z(1)=sign Z(2)=0. If the face edge intersects the Zc=0 plane, then sign Z1≠sign Z2. The intersection is found and only the portion of the edge extending in front of the pilot's eye need be considered.

Three further possibilities for the relative position of a face edge with respect to pyramid 250:

Case 1: Both ends of the face edge are within view. No clipping is necessary: OC(1)=0000(0), OC(2)=0000(0).

Case 2: One end of the face edge is within view and the other end is outside. The face edge intersects pyramid 250: OC(1)=0000(0) and OC(2)≠0000(0) or OC(1)≠0000(0) and OC(2)=0000(0).

Case 3: Both ends are outside pyramid of vision 250: OC(1)≠0000(0) and OC(2)≠0000(0).

In Case 3, definite decisions can be made only if the end points of the edge are either both to the right or both to the left (sign l(1)=sign l(2)=1(negative) or sign r(1)=sign r(2)=1(negative)). Furthermore, if OC(1)=OC(2)-0000, both ends are outside, in the same region. In all these cases the face edge can be rejected. The rejection criteria can be expressed as a Boolean function (R) of the two out-codes. If R=0, none of the above rejection criteria are satisfied, and a part of the face edge boundary may go through image window 260.

Whenever Case 2 is found in the clipping process, the intersection of each face edge and pyramid of vision 250 is determined by window circuits 510 and the clipping portion of control 70 using a binary search technique. The algorithm for the search is as follows:

(A) Let the window coordinates of the vertex inside image window 260 be Vin and the outside coordinates be Vout.

(B) The midpoint between Vin and Vout is calculated.

(C) If the midpoint is within pyramid 250, Vin is replaced by the midpoint.

(D) If the midpoint is outside, Vout is replaced by the midpoint.

(E) The process continues until the distance of the midpoint from one side of pyramid 250 is less than the termination tolerance.

There remains the problem of modifying the edges of clipped faces. In some situations the intersections of the face edges and pyramid of vision 250 define the new face edge. In other situations one or more corners of the window must be inserted into the sequence of vertices to complete the closed polygon face.

In a special case all vertices are outside pyramid 250 and the edges do not intersect pyramid 250. There remains ambiguity as to whether the face is within view. Referring to FIG. 2b showing image window 262, 4 rays (R1, R2, R3, and R4) extend from the four corners (C1, C2, C3, and C4) of window 260. If a ray is intersected an odd number of times by the edges of the polygon face, then the corresponding corner is surrounded by the polygon. This technique can be implemented by inspecting the out-codes of the adjacent vertices defining each edge. The criterion for crossing the rays is very similar to the rejection criterion and is obtained by logical operations. As an example, R1 is crossed if sign t(1)=sign t(2)=1 and sign l(1)≠sign l(2).

Projection Stage 64

General

Figure 6:
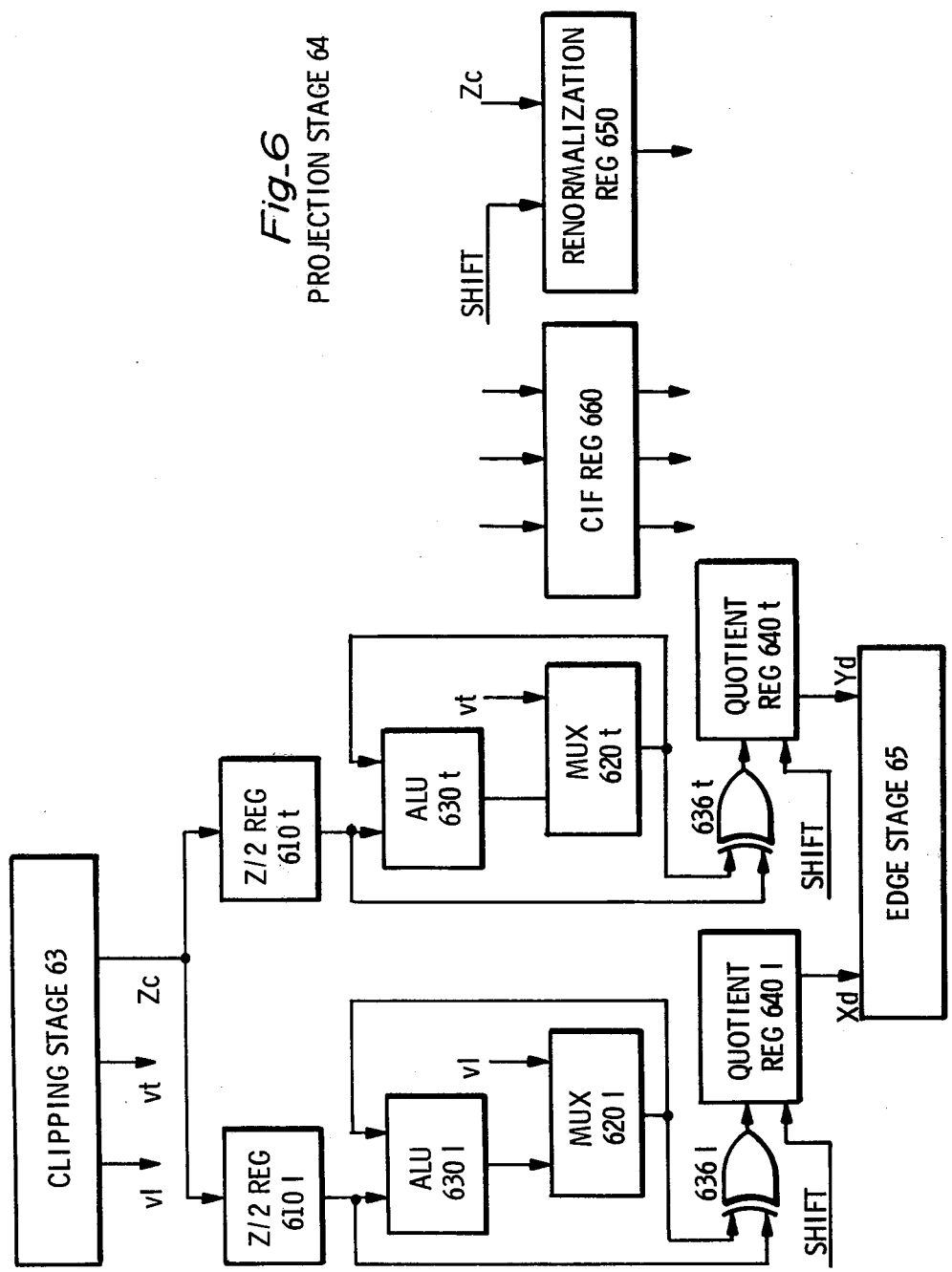
FIG. 6 is a block diagram of projection stage 64 wherein Xc and Yc are divided by Zc to project Vc into the X-Y plane.

FIG. 6 shows projection and clipping stage 64 of image processor 42 which projects three-dimensional window coordinates vl, vt, and Vz from clipping stage 63 into a two-dimensional vector Vd (Xd, Yd). The projected vectors Vd define the end points of each face edge for face generation stage 65. The projection is accomplished by dividing vl and vt by Zc through a binary division nonrestoring technique (described in "Digital Arithmetic-I" by Y. Chu pages 39–43). Z/2 registers 610-l and 610-t load the divisor Zc/2, and MUX/Register 620-l and 620-t select and load the dividend vl/2 and vt/2 in response to control logic 70. The inputs to registers 610 and 620 are right-shifted by one digit to establish the division by two. Arithmetic logic unit ALU 630-l and 630-t then receive the dividends through shift return loops 623-l and 623-t, or subtract Zc/2 thereto in response to a ± function from logic 70. The dividend ±Zc/2 term is loaded into MUX's 620, returned to ALU's 630, and then combined with another ±Z/2. The output of ALU's is slew wired with respect to the input to MUX's 620 causing a division by two right shift. The vl/Vz and vt/Vz quotients are generated one bit at a time, MSB first, by comparing the sign bit (MSB) of Zc with the sign bit of the partial remainders with MUX 620 through sign gates 636-1 and 636-t. The quotient bits individually enter quotient registers 640-1 and 640-t, and are left-shifted by control logic 70. Zc on line 592 from range register 590 is loaded into renormalization register 650 and right-shifted by control logic 708 the same number of places as were left-shifted in normalizer 370 in translation stage 60. Color, intensity, the flag data on line 592 from CIF register 590 is loaded into CIF register 660 in response to control logic 70.

DETAILED DESCRIPTION z/2 register 610 may be a 24 bit register (four 75S174's).

MUX/Registers 620 may be 24 bit 2:1 multiplexers (five 74S298's) with storage.

ALU's 630 may be 16 bit flowthrough arithmetic logic units (four 74S181's+one 74S182).

Sign gates 636 may be exclusive OR gates (74S86).

Quotient registers 640 may be 12 bit shift registers (three 74164's) for receiving the projected data Xd and Yd one bit at a time as it is generated by ALU's 630.

Zc register 650 may be a 24 bit shift register (six 74S195's).

CIF register 660 may be a series of 74S174's.

EDGE STAGE 65

General

Figure 7:
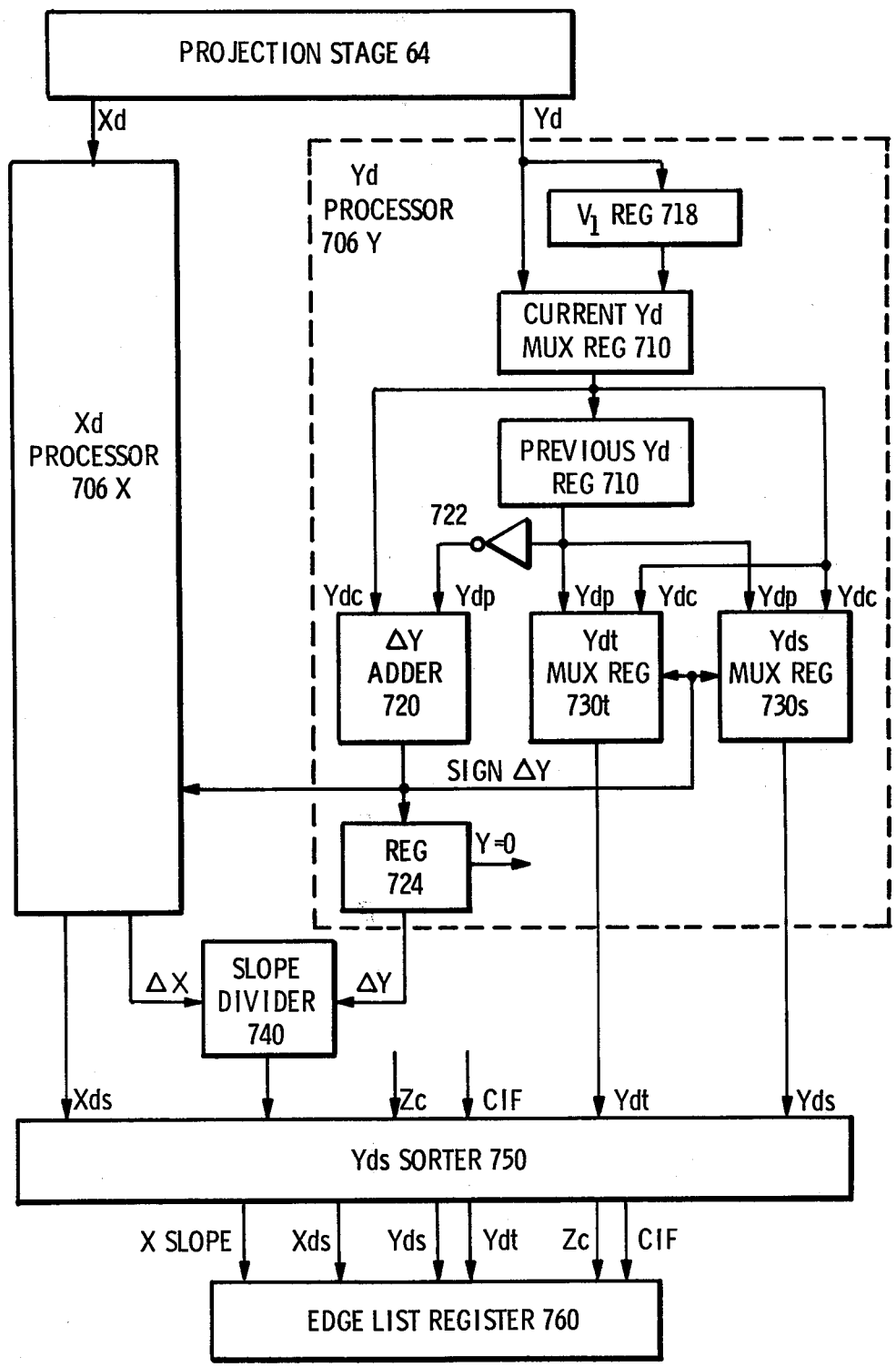
FIG. 7 is a block diagram of edge stage 65 which identifies the edges of each polygon face and the slopes thereof.

FIG. 7 shows edge stage 65 having Xd processor 706X and Yd processor 706Y which receive projected face vertex coordinates (Xd and Yd) from projection stage 64 and provides face edge lists to display generator 44. Each edge is defined by edge data including a starting point (Xds, Yds), the Y coordinate of the termination point (Ydt), plus the slope of the edge (delta X/delta Y).

The Y coordinates of each set of face vertices (Xd and Yd) are loaded into current Y mux-register 710 and advanced to previous Y register 716 in CCW order as defined in data base 48. Each current Y coordinate (Ydc) and previous Y coordinate (Ydp) are forwarded to adder 720 for calculating a delta Y for each face edge or pair of points (delta Y=Ydc−Ydp). Simultaneously, each Ydc and Ydp are entered into Y start multiplexer 730s and Y terminate multiplexer 730t. The starting Y coordinate Yds is the end point of each face edge that is scanned first on CRT 82; and the terminate Y coordinate Ydt is scanned last. In the embodiment shown, the conventional top to bottom scan is employed. Therefore, the start point Yds is always the smaller of the two adjacent points Ydc and Ydp. The sign bit of delta Y (SIGN ΔY) defines which is smaller, Ydc or Ydp, as follows:

| for + delta Y | for − delta Y |
|---|---|
| Ydc = Ydt, and Xdc = Xdt | Ydc = Yds, and Xdc = Xds |
| Ydp = Yds, and Xdp = Xds | Xdp = Xdt, and Xdp = Xdt | and activates multiplexers 730s and 730t accordingly. Slope divider 740 provides the slope of each edge face by computing delta X/delta Y for the corresponding pair of vertices.

The face edges are arranged in scan order by Yds sorter 750 according to the smallest Yds. Each edge data set is loaded into sorter 750 in CCW order and forwarded to image generator 44 in order of smallest Yds for accomodating the top to bottom scan.

DETAILED DESCRIPTION

Xd processor 706X has the same hardware as Yd processor 706Y, and is therefore not shown in detail.

Current Y mux-register 710 may be a 12 bit 2:1 multiplexerregister (three 74298's) for the current vertex of each face as the vertices are received in CCW order from quotient registers 640-1 and 640-t.

Previous Y register 716 may be a 12 bit storage register (two 74174's) for holding the vertex just preceding the current vertex.

First vertex Y register 718 may be a 12 bit storage register (two 74174's) for holding the first vertex while the intermediate vertices are processed. The first vertex is loaded into current mux-register 710 as the last vertex is advanced to previous vertex status to form the last edge of the face.

Adder 720 may be a 12 bit adder (three 74283's) for calculating delta Y=Ydc−Ydp, and forwarding SIGN Y to Y and X multiplexers-registers 730s and 730t.

Inverter 722 may be a 12 bit inverting buffer (two 74S04's) for inverting Ydp into −Ydp. The carry in on adder 720 is forced to 1 to complete the complement of Ydp.

Start point and terminate point multiplexer-register 730 may be 12 bit 2:1 multiplexer-registers (three 74298's each) for simultaneously holding both Ydc and Ydp available for selection as either Yds or Ydt.

Delta Y register 724 may be a 12 bit storage register (three 74S175's) for holding delta Yc while divider 740 forms the slope (delta Xp/delta Yp) for the previous edge. Additionally register 724 may include a zero detect circuit (one 74S30) for providing deltaY=0 to control 70 when the slope is horizontal and the edge may be omitted from further processing.

Divider 740 may be a 12 input bit-20 output bit binary division nonrestoring divider as described in projection stage 64, for calculating slope=delta X/delta Y. The dividend delta X may be right shifted into additional shift register (one 74166) for scaling down the resulting slope to accomodate a Y increment of one raster line. In the embodiment shown the right shift is nine places to accomodate a 1024 scan line, interlaced display (2 to the 9th=512).

Sorter 750 may be a 12 bit key-96 bit non key sorter for output edge data in order ascending of Yds, formed by:
(a) a 16 word 12 bit key data RAM (three 74S189's) for receiving and storing the key data (Yds) in input order.
(b) a 16 word 5 bit pointer RAM (two 74S189's) for storing the RAM pointers.
(c) a three level pointer pushdown stock (two mux-registers 74298's—first level, one 74S174—second level, and one 74S174—third level) for manipulating pointers into sorted order each time a new key is received by the key data RAM.
(d) address counter (one 74161) and smallest key pointer register (one 74S174) for generating RAM addresses and storing the current smallest key RAM address.
(e) RAM address multiplexer (two 74S153's) and a pointer RAM inut multiplexer (three 74S153's) which cooperates with the three level stack and address counter for selecting RAM addresses and the pointer RAM input.

(f) an existing key register (three 74S175's) and comparator (three 74S85's) for determining where to insert the input key among the existing key in the key data RAM. The existing key register also stores key data to be advanced to image generator 44.

(g) non key data output register (twenty-four 74S175's) for storing non key data (Xds, slope, Ydt, Zc, and CIF) to be advanced to image generator 44.

CONTROL LOGIC

Processor control logic 70 responds to instruction code and data flags contained in the data flow from data base 48 for processing the coordinate data through image processor 42. The flow tables described below disclose the logic involved in controlling each stage of image processor 42. Various hardware circuit configurations could incorporate this logic.

TRANSLATION STAGE 60--CONTROL LOGIC FLOW TABLE

I. TRANSFER INSTRUCTION WORD: CONTROLLER 46 TO REGISTER 310

STEP IA:
    (1) Maintain LOAD signal on instruction register 310.
    (2) Load next instruction from buffer register 306 into instruction register 310 (LOAD).

DECISION IA: Is image data available to translation stage 60 on data bus 307? (DAV)
    YES--STEP IB    NO--STEP IA STEP IB:
    (1) Clear accumulator 370 (CLR).
    (2) Clear scaler data "S" from scale register in scaler 360.
    (3) Clear address counter 320A (CLR).
    (4) Set DAR from control logic 70, wait for DAV from interface controller 46.

DECISION IB: Decode four MSB of instruction in register 310A to identify one of sixteen instructions (0-15).

II. LOAD X INSTRUCTION--LDX (0)

STEP IIA:
    (1) Load address counter 320A with four bits of address "A" (LOAD).
    (2) Unit decrement word counter 320B (DEC).

DECISION IIA: DAV?
    YES--DECISION IIB    NO--DECISION IIA

DECISION IIB: What is R?

| R=1 (fine 16 bit) | R=2 (coarse 16 bit) | R=3 (normal 24 bit) |
|---|---|---|
| 1. Load 16 LSB from bus 307 into RAM 350X. | 1. Same as DECISION IIB (R=1) 1 through 3 except load 16 MSB at 1. | 1. Load 16 LSB from bus 307 into RAM 350X. |
| 2. Load zeros into RAMs 350 Y and Z. | . | 2. Request DAR, wait for DAV. |
| 3.a. Unit increment address counter 320A (INC). | . | 3. Load 8 MSB from bus 307 into RAM 350X. |
| 3.b. Unit decrement word counter 320B (DEC). | . | 4. Load zeros into RAMs 350 Y and Z. |
| 3.c. Set DAR, wait for DAV. | . | 5. Same as DECISION IIB (R=1)3. |
| 4. DECISION IIC. | 2. DECISION IIC. | 6. DECISION IIC. |

DECISION IIC: Is word count in register 320 B=0?
    YES--STEP IA    NO--DECISION IIA

III. LOAD Y INSTRUCTION--LDY (1)

STEP IIIA: Same as STEP IIA.
    DECISION IIIA: DAV?
    YES--DECISION IIIB    NO--DECISION IIIA DECISION IIIB: What is R?

| R=1 | R=2 | R=3 |
|---|---|---|
| 1. Load 16 LSB from bus 307 into RAM 350Y. | 1. Same as DECISION IIIB (R=1)1 through 3 except load 16 MSB at 1. | 1. Load 16 LSB from bus 307 into RAM 350Y. |
| 2. Load zeros into RAMs 350 X and Z. | . | 2. Set DAR, wait for DAV. |
| 3. Same as DECISION IIB (R=1)3. | . | 3. Load 8 MSB from bus 307 into RAM 350X. |
| . | . | 4. Load zeros into RAMs 350 X and Z. |

TRANSLATION STAGE 60--CONTROL LOGIC FLOW TABLE
-continued

|   |   |   |   |   |
|---|---|---|---|---|
|   |   |   |   | 5. Same as DE-CISION IIB (R=1)3. |
|   |   | 4. DECISION IIIC. | 2. DECISION IIIC. | 6. DECISION IIIC. |
|   | DECISION IIIC: | Is word count in register 320 B=0? |   |   |
|   |   | YES--STEP IA |   | NO--DECISION IIIA |

IV. LOAD Z INSTRUCTION--LDZ (2)

| STEP IVA: | Same as STEP IIA. | | |
|---|---|---|---|
| DECISION IVA: | DAV? | | |
| | YES--DECISION IIB | NO--DECISION IVA | |
| DECISION IVB: | What is R? | | |
| | R=1 | R=2 | R=3 |
| | 1. Load 16 LSB from bus 307 into RAM 350Z. | 1. Same as DE-CISION IVB (R=1)1 through 3, except load 16 MSB at 1. | 1. Load 16 LSB from bus 307 into RAM 350Z. |
| | 2. Load zeros into RAMs 350 X and Y. | | 2. Set DAR, wait for DAV. |
| | 3. Same as DE-CISION II (R=1)3. | . | 3. Load 8 MSB from bus 307 into RAM 350Z. |
| | | . | 4. Load zeros into RAMs 350 X and Y. |
| | . | . | 5. Same as DE-CISION IIB (R=1)3. |
| | 4. DECISION IVC. | 2. DECISION IVC. | 6. DECISION IVC. |
| DECISION IVC: | Is word count in register 320 B=0? | | |
| | YES--STEP IA | | NO--DECISION IVA |

V. LOAD XY INSTRUCTION--LXY (3)

| STEP VA: | Same as STEP IIA. | | |
|---|---|---|---|
| DECISION VA: | DAV? | | |
| | YES--DECISION VB | NO--DECISION VA | |
| DECISION VB: | What is R? | | |
| | R=1 | R=2 | R=3 |
| | 1. Load 16 LSB from bus 307 into RAM 350X. | 1. Same as DE-CISION VB (R=1)1 through 5, except load 16 MSB at 1 and 3. | 1. Load 16 LSB from bus 307 into RAM 350X. |
| | 2. Set DAR, wait for DAV. | | 2. Set DAR, wait for DAV. |
| | 3. Load 16 LSB from bus 307 into RAM 350Y. | | 3. Load 8 MSB from bus 307 into RAM 350X. |
| | 4. Load zeros into RAM 350Z. | . | 4. Set DAR, wait for DAV. |
| | 5. Same as DE-CISION IIB (R=1)3. | . | 5. Load 16 LSB from bus 307 into RAM 350Y. |
| | | . | 6. Set DAR, wait for DAV. |
| | . | . | 7. Load 8 MSB from bus 307 into RAM 350Y. |
| | . | . | 8. Load zeros into RAM 350Z. |
| | . | . | 9. Same as DE-CISION IIB (R=1)3. |
| | 6. DECISION VC. | 2. DECISION VC. | 10. DECISION VC. |
| DECISION VC: | Is word count in register 320 B=0? | | |
| | YES--STEP IA | | NO--DECISION VA |

VI. LOAD A INSTRUCTION--LDA (4)

| STEP VIA: | Same as STEP IIA. | | |
|---|---|---|---|
| DECISION VIA: | DAV? | | |
| | YES--DECISION VIB | NO--DECISION VIA | |
| DECISION VIB: | What is R? | | |
| | R=1 | R=2 | R=3 |
| | 1. Load 16 LSB from bus 307 into RAM 350X. | 1. Same as DE-CISION VIB (R=1)1 through 6, except load 16 MSB at 1, 3, and 5. | 1. Load 16 LSB from bus 307 into RAM 350X. |
| | 2. Set DAR, wait for DAV. | | 2. Set DAR, wait for DAV. |
| | 3. Load 16 LSB from bus 307 into RAM 350Y. | | 3. Load 8 MSB from bus 307 into RAM 350X. |
| | 4. Set DAR, wait for DAV. | . | 4. Set DAR, wait for DAV. |

-continued
TRANSLATION STAGE 60--CONTROL LOGIC FLOW TABLE

|  |  |  |  |
|---|---|---|---|
|  |  | 5. Load 16 LSB from bus 307 into RAM 350Z.<br>6. Same as DE-CISION IIB (R=1)3. | 5. Load 16 LSB from bus 307 into RAM 350Y.<br>6. Set DAR, wait for DAV.<br>7. Load 8 MSB from bus 307 into RAM 350Y.<br>8. Set DAR, wait for DAV.<br>9. Load 16 LSB from bus 307 into RAM 350Z.<br>10. Set DAR, wait for DAV.<br>11. Load 8 MSB from bus 307 into RAM 350Z.<br>12. Same as DE-CISION IIB (R=1)3. |
|  |  | 7. DECISION VIC. | 2. DECISION VIC. | 13. DECISION VIC. |

DECISION VIC: Is word count in register 320 B=0?
YES--STEP IA    NO--VIA

VII. RECALL X--RCX (5)
- STEP VIIA: Clear address counter 320A (CLR).
- DECISION VIIA: DAV?
  - YES--DECISION VIIB
  - NO--DECISION VIIA
- DECISION VIIB: What is R?

| R=2 (16 bit) | R=3 (24 bit) |
|---|---|
| 1. Load 16 MSB from bus 307 into RAM 350X. | 1. Load 16 LSB from bus 307 into RAM 350X. |
| 2. Set DAR, wait for DAV. | 2. Set DAR, wait for DAV. |
|  | 3. Load 8 MSB from bus 307 into RAM 350X. |
|  | 4. Set DAR, wait for DAV. |
| 3. STEP XIIA. | 5. STEP XIIA. |

VIII. RECALL Y--RCY (6)
- STEP VIIIA: Clear address counter 320A (CLR).
- DECISION VIIIA: DAV?
  - YES--DECISION VIIIB
  - NO--DECISION VIIIA
- DECISION VIIIB: What is R?

| R=2 (16 bit) | R=3 (24 bit) |
|---|---|
| 1. Load 16 MSB from bus 307 into RAM 350Y. | 1. Load 16 LSB from bus 307 into RAM 350Y. |
| 2. Set DAR, wait for DAV. | 2. Set DAR, wait for DAV. |
|  | 3. Load 8 MSB from bus 307 into RAM 350Y. |
|  | 4. Set DAR, wait for DAV. |
| 3. STEP XIIA. | 5. STEP XIIA. |

IX. RECALL Z--RCZ (7)
- STEP IXA: Clear address counter 320A (CLR).
- DECISION IXA: DAV?
  - YES--DECISION IXB
  - NO--DECISION IXA
- DECISION IXB: What is R?

| R=2 (16 bit) | R=3 (24 bit) |
|---|---|
| 1. Load 16 MSB from bus 307 into RAM 350Z. | 1. Load 16 LSB from bus 307 into RAM 350Z. |
| 2. Set DAR, wait for DAV. | 2. Set DAR, wait for DAV. |
|  | 3. Load 8 MSB from bus 307 into RAM 350Z. |
|  | 4. Set DAR, wait for DAV. |
| 3. STEP XIIA. | 5. STEP XIIA. |

X. RECALL XY--RXY (8)
- STEP XA: Clear address counter 320A (CLR).
- DECISION XA: DAV?
  - YES--DECISION XB
  - NO--DECISION XA
- DECISION XB: What is R?

| R=2 (16 bit) | R=3 (24 bit) |
|---|---|
| 1. Load 16 MSB from bus 307 into RAM 350X | 1. Load 16 LSB from bus 307 into RAM 350X. |
| 2. Set DAR, wait for DAV. | 2. Set DAR, wait for DAV. |

TRANSLATION STAGE 60—CONTROL LOGIC FLOW TABLE (continued)

|  |  |  |
|---|---|---|
|  | 3. Load 16 MSB from bus 307 into RAM 350Y | 3. Load 8 MSB from bus 307 into RAM 350X. |
|  | 4. Set DAR, wait for DAV. | 4. Set DAR, wait for DAV. |
|  |  | 5. Load 16 LSB from bus 307 into RAM 350Y. |
|  | . | 6. Set DAR, wait for DAV. |
|  | . | 7. Load 8 MSB from bus 307 into RAM 350Y. |
|  | . | 8. Set DAR, wait for DAV. |
|  | 5. STEP XIIA. | 9. STEP XIIA. |

XI. RECALL A—RCA (9)

STEP XIA: Clear address counter 320A (CLR).
DECISION XIA: DAV?
 YES—DECISION XIB  NO—DECISION XIA
DECISION XIB: What is R?

| R=2 (16 bit) | R=3 (24 bit) |
|---|---|
| 1. Load 16 MSB from bus 307 into RAM 350X. | 1. Load 16 LSB from bus 307 into RAM 350X. |
| 2. Set DAR, wait for DAV. | 2. Set DAR, wait for DAV. |
| 3. Load 16 MSB from bus 307 into RAM 350Y. | 3. Load 8 MSB from bus 307 into RAM 350X. |
| 4. Set DAR, wait for DAV. | 4. Set DAR, wait for DAV. |
| 5. Load 16 MSB from bus 307 into RAM 350Z. | 5. Load 16 LSB from bus 307 into RAM 350Y. |
| 6. Set DAR, wait for DAV. | 6. Set DAR, wait for DAV. |
|  | 7. Load 8 MSB from bus 307 into RAM 350Y. |
|  | 8. Set DAR, wait for DAV. |
|  | 9. Load 16 LSB from bus 307 into RAM 350Z. |
|  | 10. Set DAR, wait for DAV. |
|  | 11. Load 8 MSB from bus 307 into RAM 350Z. |
|  | 12. Set DAR, wait for DAV. |
| 7. STEP XIIA. | 13. STEP XIIA. |

XII. RECALL LOAD—RCL (10)

STEP XIIA:
 (1) Load accumulator 370 (X, Y, and Z) with "Vo" from RAM 350 (X, Y, and Z) at address A=0
 (2) Unit increment address counter 320A (INC).
 (3) Load accumulator 370 (X, Y, and Z) with "−Vp" from RAM 350 (X, Y, and Z) at address A=1 to form Vt=Vo−Vp.
 (4) Unit decrement word counter 320B (DEC).

DECISION XIIA: Is the face part of a three dimensional object (is 3D flag set)?
 YES—STEP XIIB  NO—STEP XIIE
 (Three dimensional case)  (Two dimensional case)

STEP XIIB:
 (1) Wait for DAV.
 (2) Load Three D register 341 (LOAD).
 (3) Set DAR, wait for DAV.
 (4) DECISION XIIB.

DECISION XIIB: Is word count ≧4? Vertex pointers are packed four to one sixteen bit word.
 YES—STEP XIIC  NO—STEP XIID STEP XIIC:
 (1) Wait for DAV.
 (2) Load Three D register 342.
 (3) Set DAR, wait for DAV.
 (4) STEP XIID.

STEP XIID:
 (1) Load address counter 320A with first vertex pointer "A" from register 310A.
 (2) Load scaler 360 with "S" from register 310B.
 (3) Load accumulator 370 with the Δ V data from RAM 350 as accessed by the pointer from the Three D buffers.
 (4) Clear address counter 320A.
 (5) Wait for DAR-T from Normalizer 380.
 (6) Enable FIRST VERTEX flag in CIF register.
 (7) Load the buffer register in accumulator

TRANSLATION STAGE 60—CONTROL LOGIC FLOW TABLE -continued

| | |
|---|---|
| | 370 with the contents of the accumulator (LOAD-B). |
| | (8) Clear "S" register in scaler 360. |
| | (9) Clear accumulator 370. |
| | (10) Unit decrement word counter 320B. |
| | (11) Load H and N address register 386 with "A" (LOAD). |
| | (12) Load accumulator 370 with Vo. |
| | (13) Unit increment address counter 320A. |
| | (14) Load accumulator 370. |
| | (15) Load address counter 320A with vertex address from Three D register 341 or 342. |
| | (16) Load scale register within scaler 360. |
| | (17) Load accumulator 370. |
| | (18) Clear address counter 320A. |
| | (19) Wait for DAR-T. |
| | (20) Repeat items 7, 8, 9, and 10 of STEP XIID |
| | (21) Same as STEP XIID items 12–19. |
| | (22) Same as STEP XIID items 7–10. |
| | (23) Load last vertex flag into CIF registers when B=0. |
| | (24) DECISION XIID. |
| DECISION XIID: | Is word count B=0? |
| | YES--STEP IA    NO--DECISION XIIE |
| | (Visibility Test) |
| STEP XIIE: | (1) Same as STEP XIID items 1 and 2. |
| | (2) Wait for DAR-T. |
| | (3) Same as STEP XIID item 7. |
| | (4) Set first vertex flag. |
| | (5) Load accumulator 370. |
| | (6) Increment address counter 320A. |
| | (7) Decrement word counter 320B. |
| | (8) DECISION XIIC. |
| DECISION XIIC: | Is word count B=0? |
| | YES--STEP IA    NO--STEP XIIF |
| STEP XIIF: | (1) Wait for DAR-T. |
| | (2) Same as STEP XIIE items 4–7 except set last vertex flag when B=0. |
| | (3) DECISION XIIC. |
| DECISION XIIE: | Is product of Visibility Test positive or negative? |
| | POSITIVE--STEP IA    NEGATIVE--STEP XIIG |
| STEP XIIG: | (1) Same as STEP XIID items 20–23. |
| | (2) DECISION XIIF |
| DECISION XIIF: | Is word count B=0? |
| | YES--STEP IA    NO--STEP XIIG |

XII. COLOR INTENSITY FLAG—CIF (11)

In this instruction the CIF registers are loaded with CIF data from bus 307. Word counter 320B is decremented after each load until B=0.

XIV. STRING INSTRUCTION—STG (12)

In this instruction the initial face of a string of faces is processed from RAM 350 through translation stage 60 into rotation stage 62 as a string of light points or four sided faces. The vertices of the four sided faces are retrieved from RAM 350 in CCW order as described in "XI. RECALL A—RCA (9)."

XV. LOAD H—LDH (13) AND LOAD N—LDN (14)

In this instruction data is loaded into H/N address register 3 from data bus 307, and then into H/N RAM 410 as described in Section VI. H/N Ram 410 receives the data during an idle portion of its cycle.

ROTATION STAGE 62

FIG. 8A shows the logic-diagram for the processing of translated point coordinates (Vt) from translation stage 62. Each new Vt is loaded into multiplexers 416X, Y, and Z (Step I). The object code in CIF register 460 which accompanies each new Vt is examined to determine if the new Vt is associated with a 3D face requiring visibility testing (Decision A). If so, the dot product of Vt·Vn (from N RAMs 410X, Y, and Z) is calculated (Step II). The sign bit of the dot product reveals whether the 3D face is visible or not (Decision B). The vertex of visible 3D faces (Decision B—yes) and the remaining non-3D face vertices (Decision A—no) are multiplied by three x three H matrix in H RAMs 410X, Y, and Z to provide the rotated vector Vc—Zc first, Yc second, and Xc last (Step III). Each coordinate is loaded into registers 450X, Y, and Z as they are calculated (Decision C and D, Steps IV, V, and VI).

CLIPPING STAGE 63

Figure 8B:
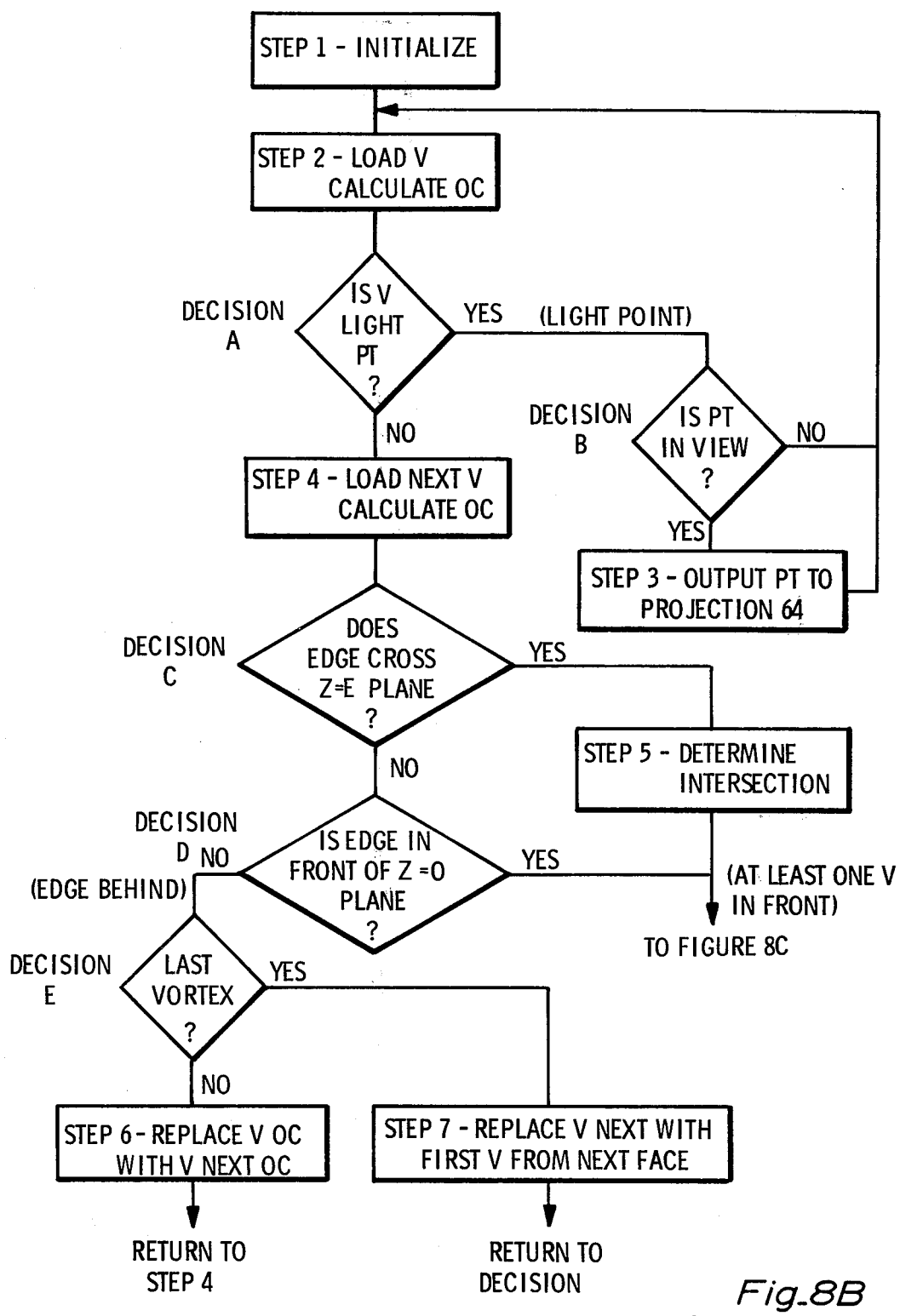
Figure 8C:
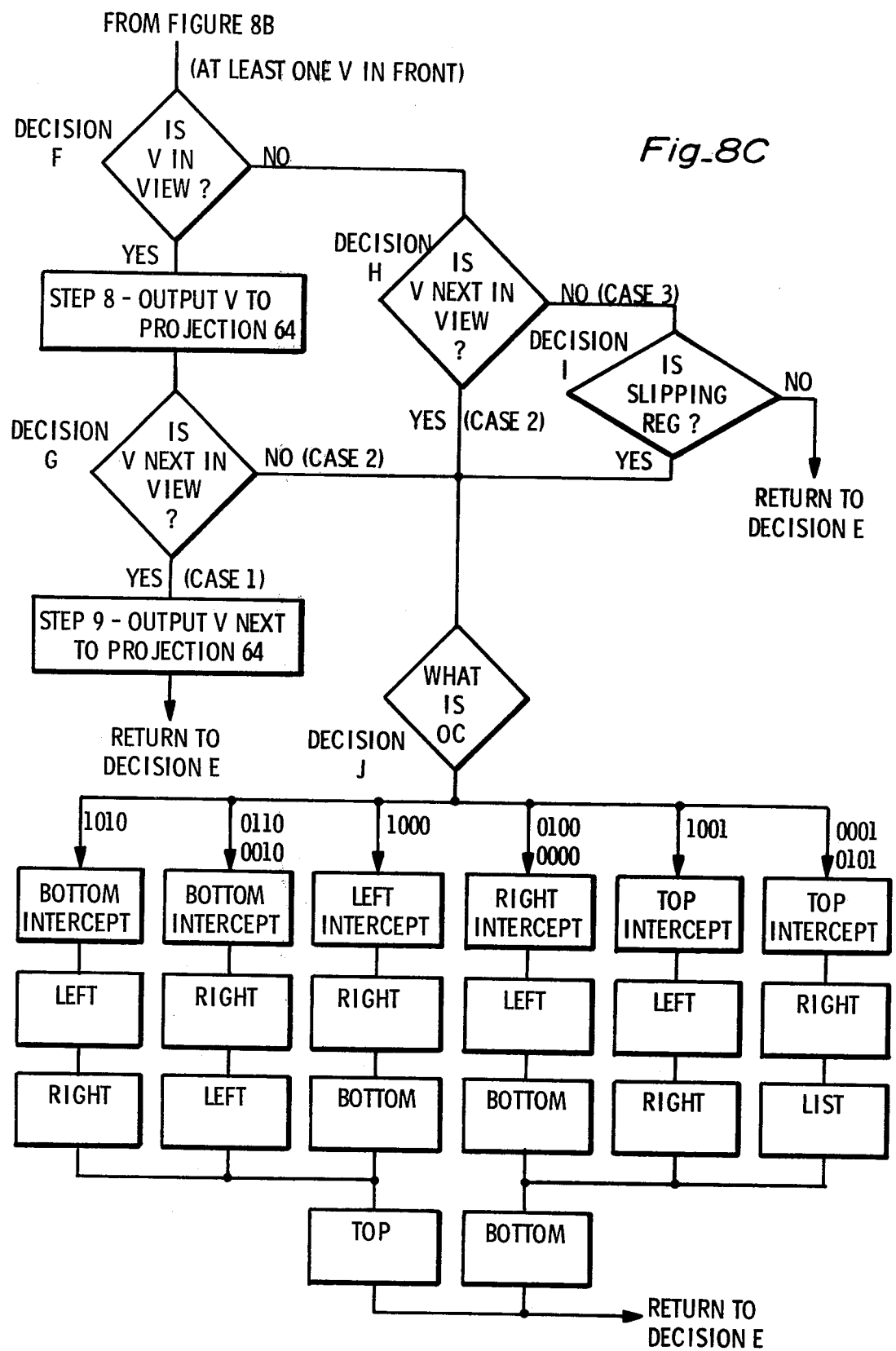

FIGS. 8B and C show the logic diagram for the control of clipping stage 63. The first point coordinates are loaded into multiplexers 520 (Step 2) and the outcode (OC) for each point is determined by window circuits 510. The object code in CIF register 590 is examined to determine whether the first coordinate is really a polygon vertex (or line end point) or merely a single light point (Decision A). In the case of vertices (and end points), the next vertex (or other end point) is loaded and outcode (OC) determined (Step 4). The OC's are examined to determine if the edge defined by the two vertices crosses the Z=0 plane (Decision C). If the edge crosses the Z=0 plane, then the intersection point is determined by a binary search (Step 5). If the edges do not cross the Z=0 plane, then the OC's of both points are examined to determine if they both are in front of pilot's eye 220 (Z=0 plane) or behind pilot's eye 220 and therefore definitely not visible (Decision D). The endpoints of edges which intersect the Z=0 plane or which are completely in front thereof, are examined via their OC for visibility (Decisions F, G, and H, and Step 8). If both endpoints are out of view (Case 3) the OC's are examined to determine if clipping is required (Decision I). If both endpoints are in view (Case 1) or otherwise do not require clipping, the next vertex coordinates are loaded. If only one vertex is in view (Case 2) or clipping is otherwise required (Case 3), the edge is processed through the appropriate series of binary search routines based on the OC's (Decision J). The binary search routines determine the interception points of the edge with the left, right, bottom or top boundaries of image plane 262. Each interception point becomes a new vertex of a new polygon formed by the visible portion of the original polygon face.

EDGE STAGE 65

FIG. 8D shows the logic diagram for the control of projection stage 64, processor 706X and Y, and slope divider 740. The clipped points from clipping stage 63 are loaded into registers 610 for projection division (Step 1). The quotients (projected points) are forwarded from registers 640 to edge stage 65, where it is examined for face data (Decision A). Non face data such as points and line segments are forwarded immediately to FIFO memory 910. Each face data point is examined for a first vertex (Decision B), which are loaded in V1 register 718 and current Yd multiplier register 710 (Step 2). Each non first vertex is loaded into register 710 as the current Yd and the previous Yd is advanced to register 716 (Step 3). Xd is similarly processed through processor 706X. Delta X and delta Y are calculated from their current and previous values, and loaded into registers 724 (Step 4). When the last vertex becomes the previous vertex in register 716 (Decision C), the face is closed by advancing V1 from register 718 to register 710 as the current vertex (Step 5). The last slope is calculated from the pevious vertex (Vlast) and the current vertex (V1) and entered into register 724. The slopes are calculated by slope divider 740 as the delta X's and delta Y's are provided (Step 6).

TEXTURE STAGE 72

FIG. 8E shows the logic diagram for the control of Yds sorter 750. Input face edges are loaded into sorter 750 and examined for horizontal edges—delta Y=0 (Decision D). Horizontal edges are forwarded to FIFO memory 910 (Step 7). The non horizontal edges are examined for a first edge (Decision E). The first edge is entered at the start of the sort list (Step 8). Non first edges are examined to determine whether the input Yds is less than the last or output Yds in sorter 750 (Decision F). Smaller inputs Yds are entered at the start of the sort list (Step 9). Larger Yds are examined for a last edge (Decision G). Last edge is entered in last place of sort list (Step 10). The second edge is loaded (Step 11) and examined for input Yds less than the last Yds in sorter 750 (Decision H). Smaller Yds are inserted in the sort list (Step 12). Larger Yds are examined for last edge (Decision I). Last edges are entered into the sort list (Step 13). If the input edge is not the last edge, the next edge is loaded (Step 14). The input edge is again examined for a last edge (Decision J)—return to Decision D of flow chart for non last edge, and output sorter 750 to FIFO memory 910 for last edge.

DISPLAY GENERATOR 44

TEXTURE STAGE 72

Texture Stage 72, shown in FIG. 9, provides miniraster data for the set of horizontal scan lines forming each face. The miniscan lines progressively increase and/or decrease in response to the face edge list (Xds, Yds, Xslope, and Ydt for each edge) from face generation stage 65. The miniraster data for each miniscan line includes the Xd coordinate of the left hand end point (XdL), the width of the miniscan line (W), the Yd coordinate (Yd scan), Zc and CIF.

The edge list is loaded into memory 910 in ascending Yd order by face order once each frame, and extracted in the same order twice each frame—once for the field of even miniscan lines, and once for the field of odd miniscan lines. X coordinate generators 920L and 920R provide XdLc and XdRc respectively for each miniscan line by combining Xds with the Xslopes of the two opposed edges of the face which contain the end points of the scan line. XdLs is incremented by the left hand slope (XL slope) to form each XdL, and XdRs is incremented by the right hand slope (XR slope) to form each XdR. Only generator 920 is shown in detail. Slope multiplexer 928 divides the XL slope by two (select START) for the first scan line of the even field, to accomodate the one half scan height displacement between the interlaced odd and even fields on display 82. During the remainder of the display cycle, the XL slope is passed through slope multiplexer 928 without division (select ACC) to accomodate the proper height spacing between adjacent miniscan lines in the same field. Adder 930 combines the X coordinate of the previous scan line (XdLp) with the current XL slope to provide the current X coordinate (XdLc). Output multiplexer register 940 provides either XdLs (select START) or XdLc (select ACC) to miniraster data register 950. Subtractor 952 provides the width W of each scan line by subtracting XdLc from XdRc (output of generator 920R). The Y coordinate of the miniscan lines (Yd scan) is similarly formed by incrementing Yds with Yslope from Yslope generator 960. At the end of each edge, Yd scan equals or exceeds the Ydt on the left edge (YdLt) or right edge (YdRt). The signals Yd scan≧YdLt and Yd scan≧YdRt indicate to control logic 70 that the next XL slope or XR slope is required in Xd generators 920.

DETAILED DESCRIPTION

FIFO memory 210 may be a 2048 words×100 bits memory (two hundred 82S11's) for sequentially outputting the complete edge list twice each cycle. Memory 210 interfaces with the remainder of miniraster calculator 72 through a 100 bit register (twenty five 74S175's).

XL slope register 924 may be a 20 bit storage register (five 74S175's) for holding each new Xslope as they are provided by memory 910.

XL slope multiplexer 928 may be a 20 bit 2:1 multiplexer (five 74S157's) with the START input right shifted to provide a division by two. The START and ACC select are provided by control logic 70.

XL Adder 930 may be a 20 bit adder (five 74283's) for incrementing each previous X left coordinate (XdLp) by the current XL slope.

Limit multiplexer 934 may be a 20 bit 4:1 multiplexer (ten 74S153's) for preventing underflow and overflow when an edge approaches the display boundary. The four inputs are XdLc (twice), all ones (overflow), and all zeros (underflow). The two select inputs are the sign bits of XdLc and XL slope. Underflow occurs when both sign XdLc and sign XL slope are negative. Overflow occurs when sign XdLc is negative and sign XL slope is positive.

XdLs register 938 may be a 12 bit register (three 72S175's) for holding the X coordinate of the starting end point of the current edge (Xds) as it is provided by FIFO memory 910.

Output multiplexer register 940 may be a 20 bit 2:1 multiplexer register (five 25S09's) for accumulating XdLc and outputting either XdLs or XdLc. The output is returned to adder 930 and forwarded to miniraster data register 950.

Miniraster data register 950 may be a 76 bit register (nineteen 74S175'S) for holding the miniraster data (XdLc 12 bits, W 12 bits, Yd scan 12 bits, CIF 24 bits, and Z 16 bits.

Subtractor 952 may be a 12 bit subtractor (three 74283's and two 74S04's) for providing the width of each miniscan line (W=XdRc−XdLc) to register 950.

Yslope generator 960 may be a 12 bit register (three 74S175's) hardwired to specify the maximum number of miniraster scan lines per frame. This number defines the scan density or Yslope.

Yslope multiplexer 964 may be a 12 bit multiplexer (two 74S157's) similar in function to Xslope multiplexer 928.

Y Adder 968 may be a 12 bit adder (thre 74283's) for combining the 12 bits of Yslope with the 12 bits of Y coordinate of the previous scan line (Ydp) to form the Y coordinate of the current scan line (Yd scan).

Multiplexer register 970 may be a 12 bit multiplexer register (three 25S09's) similar in function to output multiplexer register 940.

Ydt register 974 may be a pair of 12 bit registers (six 74S175's) for holding the Yd coordinates of the left hand edge termination point (YdLt) and the right hand edge termination point (YdRt) which are periodically forwarded by FIFO memory 910.

Comparator 978 may be a pair of 12 bit comparators (six 74S85's) for comparing Yd scan with YdLt and YdRt to determine the end of each edge.

DEFLECTION CONTROL 74

Deflection stage 74 receives Yd scan accompanied by a series of XdLc's and W's for generating the sweep voltages which provide the series of horizontal scan lines outlining each polygon face. Yd scan identifies vertical position of the first vertex. XdL identifies the left hand start of each scan line thereafter. W determines the length of each scan line. Conventional integrator techniques may be employed to provide the appropriate X and Y ramp deflection voltages. The Y ramp changes at a uniform rate starting at Yd scan to move the CRT beam vertically across the face being displayed. The X ramps change at a much faster rate starting from an XdL to move the beam horizontally a distance indicated by the associated W. Suitable deflection techniques are disclosed in detail in U.S. Pat. No. 3,999,308 entitled "Real-Time Simulation of a Point System Having Textured Areas as Viewed by a Moving Observer" issued on Dec. 28, 1976 to Robert Louis Peters.

VIDEO CONTROL 76

Video control 76 receives color and intensity data from CIF 660 in projection stage 64 for each face being displayed to control the color and display brightness of the scan lines forming that face. If desired, the display intensity may be attenuated byZc data for range simulation. Suitable video control techniques are also disclosed in detail in U.S. Pat. No. 3,999,308.

FULL RASTER EMBODIMENT

If desired, the edge list from register 760 may be displayed on a full raster in the conventional frame manner across the entire screen of display device 82. The vertices of all visible polygon faces (or visible portions thereof) for each frame are sorted by Yds to arrange the vertices in display order by raster. Next, the contents of each scan line are sorted by Xds to arrange the verti-

OPERATION OF SHAPE MEMORY AND SCALING CONTROL

Shape memory 60M is shown in translation stage 60 (FIG. 3) as 16 word random access memory 350 which is loaded with 15 or less dependent vertices (typically from several faces) at addresses A=1 to A=15 in response to load instructions (i.e. LDA, LXY, LX, LY or LZ; see VI-4 to VI-6). Address A=0 is always occupied by Vp from flight simulator 16. The coordinates of each dependent vertex in both two dimensional and three dimensional structures depend on an initial point which is the first vertex of each face for two dimensional structures or may be an outside point for three dimensional structures (see the delta data format of Section V, shown in FIG. 2A). After shape memory 60M is loaded with dependent vertice coordinates forming fundamental shapes, the initial point of each face is provided via Recall an instruction (i.e. RCA, RXY, RCX, RCY or RCZ; see VI-7 to VI-8). Each dependent vertex is combined with its initial point by accumulator 370 to effect either the two dimension or three dimension translation (see Section VIII page 3).

Figure 10:
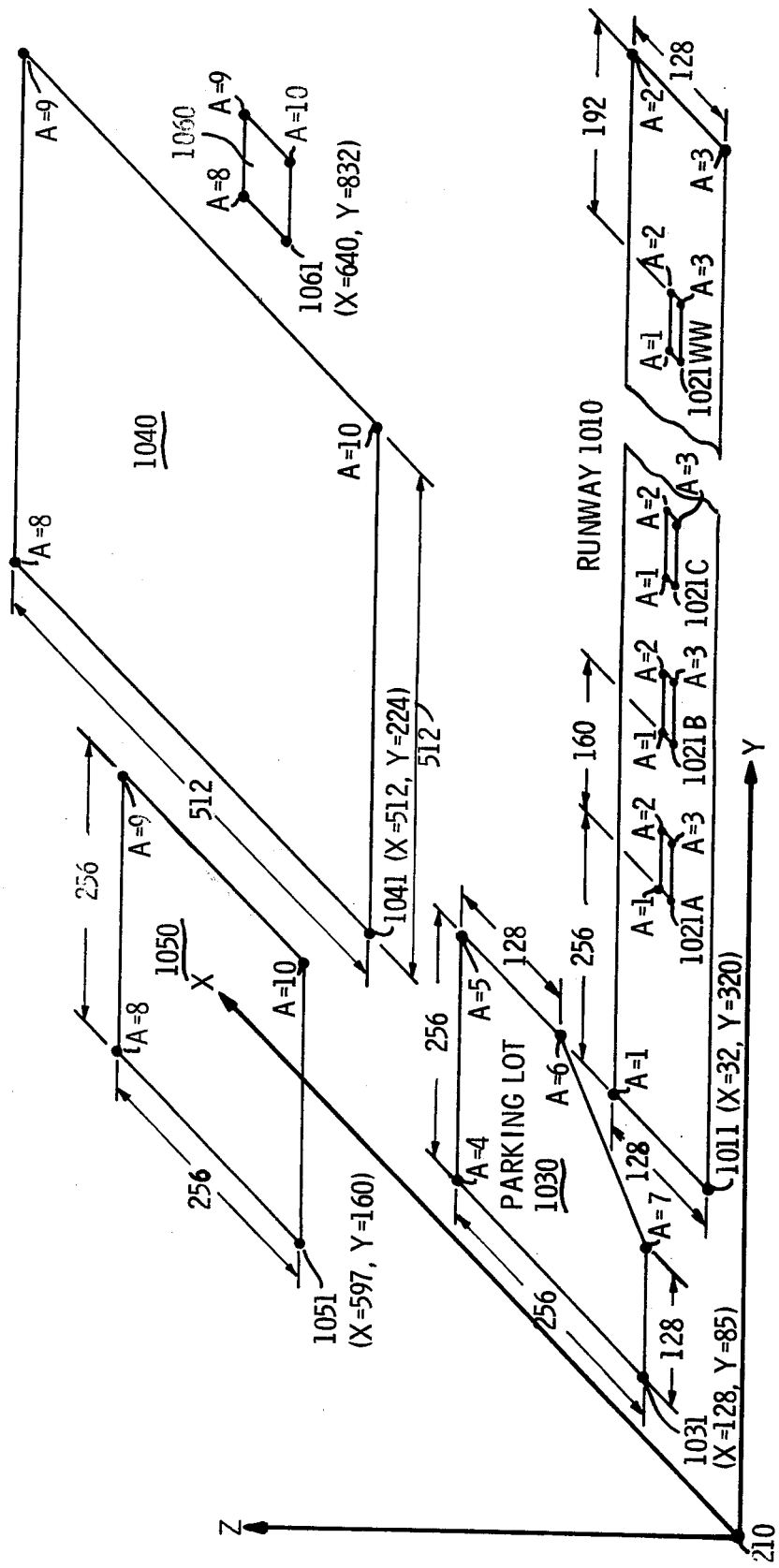

Two-Dimensional Example—FIG. 10

Table I shows the load and recall instructions to input register 310 and the corresponding writing and reading by shape memory 60M for processing rectangular (128'×8196') runway 1010, rectangular (1'×64') center markings 1020A, B, C, . . . W, truncated parking lot 1030 and miscellaneous fields 1040 (512'×512'), 1050 (128'×128') and 1060 (64'×64'). All of the faces of the FIG. 10 scene are located in the XY ground plane and do not require any change in elevation (Z coordinate). Also, for illustrative convenience, all of the face edges are oriented parallel with the X and Y axis. The delta data entries for these axis aligned faces is merely a single X or Y entry to advance each dependent vertex over the previous vertex. Each fundamental shape of FIG. 10 may be loaded into shape memory 60M (RAM 350) by a separate load instruction on the first occassion for that fundamental shape. In Table I, the fundamental shapes are rectangular runway 1010, truncated parking lot 1030, and the largest field 1040. Each shape has been entered into RAM 350 as required. Alternatively, the entire series of fundamental shapes (or part thereof) may be loaded into RAM 350 under one instruction, to be recalled and scaled later as required. Center markings 1020 A-WW do not require a load instruction or separate space within the shape memory because they are identical in shape and orientation to previously entered runway 1010. The only difference between runway 1010 and center markings 1020 A-WW is the size and number. Center marking 1020 A-Z are provided by scaling down the data for runway 1010. Control 60C (scalor 360) right shifts the binary point of the X, Y, and Z coordinates therein one place for S=1, two places for S=2, etc. An input of S=7 to scalor 360 reduces the 128'×8196' dimensions of runway 1010 to the 1'×64' dimensions of center markings 1020.

Recall instructions provide the first vertex to each face (the initial object point) and supply the addresses in RAM 350 of the delta data for the other vertices of that face. The output to rotation stage 62 is formed by each first vertex along with the accumulating sum of each first vertex and the delta data for each subsequent vertex dependent thereon. Accumulator 370 accomplishes the necessary addition.

TABLE I

(2D Objects)

| | Image Data on Bus 307 | | | Writing Into RAM 350 | | |
|---|---|---|---|---|---|---|
| | | | | X | Y | Z |
| runway 1010 | LXY A=1 B=3 | | | | | |
| | B=1 X=128 Y=0 | A=1 | | 128 | 0 | 0 |
| | B=2 X=0 Y=8196 | A=2 | | 0 | 8196 | 0 |
| | B=3 X=−128 Y=0 | A=3 | | −128 | 0 | 0 |
| lot 1030 | LXY A=4 B=4 | | | | | |
| | B=1 X=256 Y=0 | A=4 | | 256 | 0 | 0 |
| | B=2 X=0 Y=256 | A=5 | | 0 | 256 | 0 |
| | B=3 X=−128 Y=0 | A=6 | | −128 | 0 | 0 |
| | B=4 X=−128 Y=−128 | A=7 | | −128 | −128 | 0 |
| field 1040 | LXY A=8 B=3 | | | | | |
| | B=1 X=512 Y=0 | A=8 | | 512 | 0 | 0 |
| | B=2 X=0 Y=512 | A=9 | | 0 | 512 | 0 |
| | B=3 X=−512 Y=0 | A=10 | | −512 | 0 | 0 |
| | | | | Output to Rotation Stage 62 | | |
| vertex 1011 | RXY A=1 S=0 B=3 | | | | | |
| | X=32 Y=320 | 1011 | | 32 | 320 | 0 |
| | | A=1 | | 160 | 320 | 0 |
| | | A=2 | | 160 | 8512 | 0 |
| | | A=3 | | 32 | 8512 | 0 |
| vertex 1021-A | RXY A=1 S=7 B=3 | | | | | |
| | X=96 Y=576 | 1021-A | | 96 | 576 | 0 |
| | | A=1 | | 97 | 576 | 0 |
| | | A=2 | | 97 | 640 | 0 |
| | | A=3 | | 96 | 640 | 0 |
| vertex 1021-B | RXY A=1 S=7 B=3 | | | | | |
| | X=96 Y=736 | 1012-B | | 96 | 736 | 0 |
| | . . | A=1 | | 97 | 736 | 0 |
| | . . | A=2 | | 97 | 800 | 0 |
| | . . | A=3 | | 96 | 800 | 0 |
| | . . | | | . . . | | |
| | . . | | | . . . | | |
| vertex 1021-WW | RXY A=1 S=7 B=3 | | | 96 | 8256 | 0 |
| | X=96 Y=9256 | 1021-WW | | 97 | 8256 | 0 |
| | | A=1 | | 97 | 8420 | 0 |
| | | A=2 | | 96 | 9420 | 0 |
| | | A=3 | | | | |
| vertex 1031 | RXY A=4 S=0 B=4 | | | | | |
| | X=128 Y=85 | 1031 | | 128 | 85 | 0 |
| | | A=4 | | 384 | 85 | 0 |
| | | A=5 | | 384 | 341 | 0 |
| | | A=6 | | 256 | 341 | 0 |
| | | A=7 | | 128 | 213 | 0 |
| vertex 1041 | RXY A=8 S=0 B=3 | | | | | |
| | X=512 Y=224 | 1041 | | 512 | 224 | 0 |
| | | A=8 | | 1024 | 224 | 0 |
| | | A=9 | | 1024 | 736 | 0 |
| | | A=10 | | 512 | 736 | 0 |
| vertex 1051 | RXY A=8 S=0 B=3 | | | | | |
| | X=597 Y=−160 | 1051 | | 597 | −160 | 0 |
| | | A=8 | | 853 | −160 | 0 |
| | | A=9 | | 853 | 96 | 0 |
| | | A=10 | | 597 | 96 | 0 |

TABLE I-continued (2D Objects)

vertex 1061

| RXY  A=8 S=3 B=3 |
|---|
| X=640   Y=832 |

| | | |
|---|---|---|
| 1061 | 640 | 832 | 0 |
| A=8 | 704 | 832 | 0 |
| A=9 | 704 | 896 | 0 |
| A=10 | 640 | 896 | 0 |

Three-Dimensional Example—FIG. 11

Table II shows the load and recall instructions to input register 310 and the corresponding writing and reading by shape memory 60M for processing the rectangular volume (64′ deep×128′ wide×32′ high) of hanger 1110. For illustrative convenience, the three edges of hanger 1110 are positioned parallel to the three axis of the object coordinate system. The relative positions with respect to initial point 1120 of the eight vertices of hanger 1110 are loaded into RAM 350. Next, CIF data is processed which indicates to control logic 70 that hanger 1110 is a 3D object (Obj Code=0). Other data such as intensity (I), color, scan resolution (Ver Res) etc. are also processed from the CIF entry. Initial point 1120 for hanger 1110 is loaded into RAM 350 at address A=1. Each face A-E is then recalled one at a time by means of the addresses given in the B1 word following the RCA instruction. The vertices are always recalled from RAM 350 in CCW order as viewed from the outside of the 3D object being processed. Hanger 1110 is processed through the remainder of image processor 42 as a series of adjacent faces. Additional identical hangers may be generated without reloading RAM 350 merely by loading another initial point (Vo) at address A=1 and recalling the vertices in the same order. Other building having the same fundamental shape but different dimensions may be provided by loading an initial point with different scale data S.

TABLE II (3D Objects)

| Image Data on Bus 307 | Writing Into RAM 350 |
|---|---| hanger 1110

| LDA  A=4  B=8 | | | X | Y | Z |
|---|---|---|---|---|---|
| B1 | X= 0 Y= 32 A= 0 | A= 4 | 0 | 32 | 0 |
| B2 | X=64 Y= 32 Z= 0 | A= 5 | 64 | 32 | 0 |
| B3 | X=64 Y=160 Z= 0 | A= 6 | 64 | 160 | 0 |
| B4 | X= 0 Y=160 Z= 0 | A= 7 | 0 | 160 | 0 |
| B5 | X= 0 Y= 32 A=32 | A= 8 | 0 | 32 | 32 |
| B6 | X=64 Y= 32 Z=32 | A= 9 | 64 | 32 | 32 |
| B7 | X=64 Y=160 Z=32 | A=10 | 64 | 160 | 32 |
| B8 | X= 0 Y=160 Z=32 | A=11 | 0 | 160 | 32 |

| | CIF | SEL AXIS | S± | I | B=2 |
|---|---|---|---|---|---|
| B1 | Spares | Obj Code=0 | FB | IOS | Ver Res |
| B2 | Color− | Color + | Col Sel | Spares | | initial point 1120

| LDA  A=1  S=0 B=1 |
|---|
| X=40   Y=48 |

| | | | |
|---|---|---|---|
| A= 1 | 40 | 48 | 0 |

Output to Rotation Stage 62

A (front)

| RCA          B=1 |
|---|
| A=4  A= 7  A=11  A= 8 |

| | | | |
|---|---|---|---|
| A= 4 | 40 | 80 | 0 |
| A= 7 | 40 | 208 | 0 |
| A=11 | 40 | 208 | 32 |
| A= 8 | 40 | 80 | 32 |

TABLE II-continued (3D Objects)

B (L side)

| RCA          B=1 |
|---|
| A=5  A= 4  A= 8  A= 9 |

| | | | |
|---|---|---|---|
| A= 5 | 104 | 80 | 0 |
| A= 4 | 40 | 80 | 0 |
| A= 8 | 40 | 80 | 32 |
| A= 9 | 104 | 80 | 32 |

C (rear)

| RCA          B=1 |
|---|
| A=6  A= 5  A= 9  A=10 |

| | | | |
|---|---|---|---|
| A= 6 | 104 | 208 | 0 |
| A= 5 | 104 | 80 | 0 |
| A= 9 | 104 | 80 | 32 |
| A=10 | 104 | 208 | 32 |

D (R side)

| RCA          B=1 |
|---|
| A=7  A= 6  A=10  A=11 |

| | | | |
|---|---|---|---|
| A= 7 | 40 | 208 | 0 |
| A= 6 | 104 | 208 | 0 |
| A=10 | 104 | 208 | 32 |
| A=11 | 40 | 208 | 32 |

E (top)

| RCA          B=1 |
|---|
| A=8  A=11  A=10  A= 9 |

| | | | |
|---|---|---|---|
| A= 8 | 40 | 80 | 32 |
| A=11 | 40 | 208 | 32 |
| A=10 | 104 | 208 | 32 |
| A= 9 | 104 | 80 | 32 |

OPERATION OF PATTERN GENERATOR 71

Figure 12A:
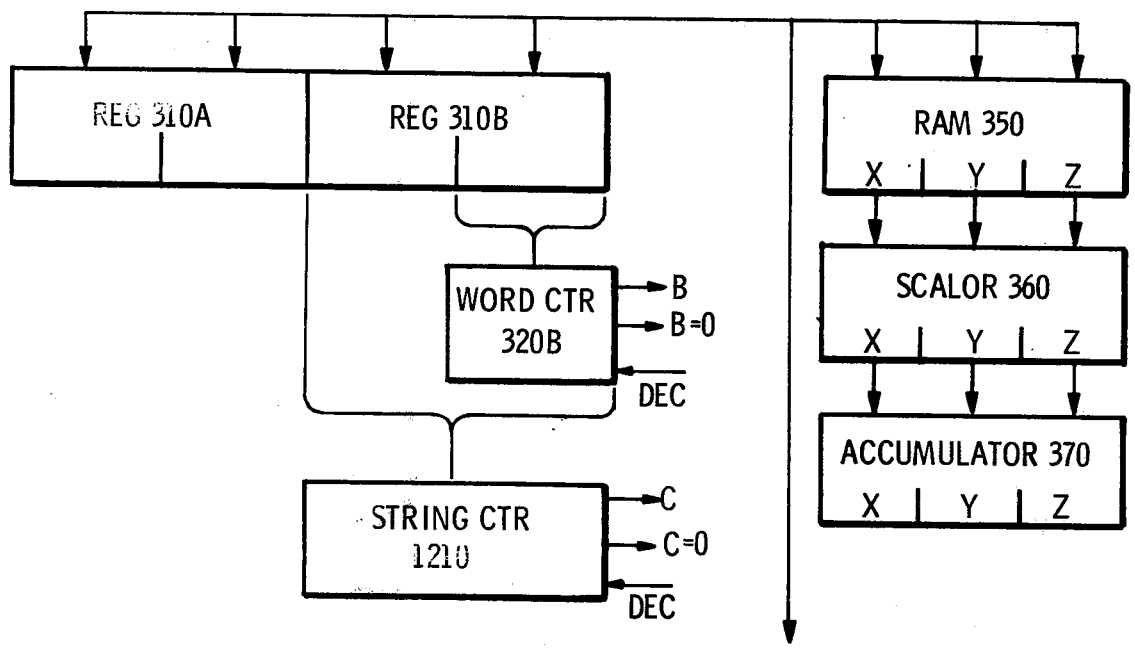
FIGS. 12A and B show circuit configurations for pattern generator 71.
Figure 13:
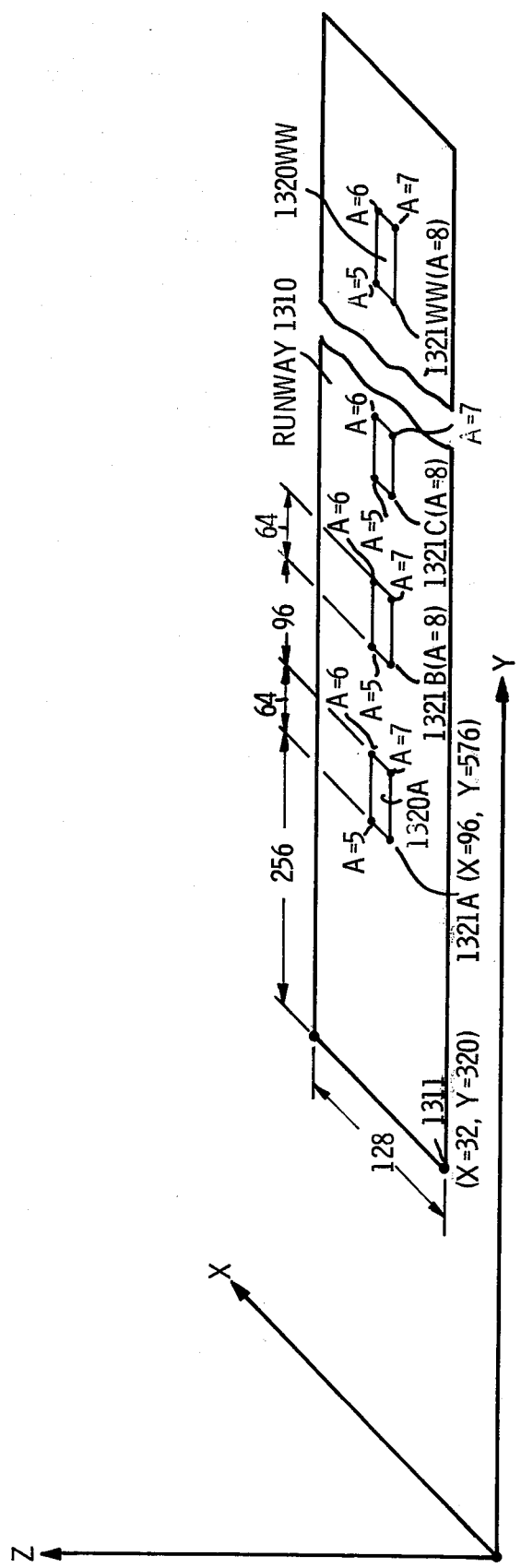
FIG. 13 shows the layout of a display scene formed by pattern generator 71.

Pattern generator 71 is formed by string counter 1210 and the decoding hardware of translation stage 60 as shown in FIG. 12A. FIG. 13 shows a typical pattern of repeating faces--forty nine runway center markings 1320A through 1320WW within runway 1310. The number of units or faces in each series of faces (which is forty nine in the FIG. 13 example) appears in register 310B as "C" in response to the load string instruction "STG" (see Section VI page 13), and is stored in string counter 1210 during the pattern generation. Table III fundamental shape of the repeated face and initial point 1321A (the first vertex of center marking 1320A) are entered into RAM 350 and recalled "C" times in response to the string instruction (STG). Initial point 1321A and other three vertices of center marking 1320 are recalled from RAM 350 memory location A=1, A=4, A=5 and A=6 to define the rectangular shape. The first vertex 1321B of the next face of the series (center marking 1320B) is defined by a vector from the preceding face (center marking 1320A) located in RAM 350 at A=8. This vector is the increment data for the center mark face series and defines the distance between adjacent faces. Control logic 70 causes C counter 1310 to decrement and RAM locations A=5 through A=8 to be repeated after the recall of each fourth point. The recall of vertex 1321B causes a "C" to be decremented from 49 to 48, and returns the read address of RAM 350 to A=5. When C=0, the string of faces is finished, and the next instruction is loaded into register 310.

TABLE III (Pattern Generation)

| Image Data on Bus 307 | Writing into RAM 350 |
|---|---|

TABLE III-continued
(Pattern Generation)

| | | | | | | X | Y | Z |
|---|---|---|---|---|---|---|---|---|
| runway 1110 | | LXY A=2 B=3 | | | | | | |
| | B=1 | S= 128 | Y= 0 | | A=2 | 128 | 0 | 0 |
| | B=2 | X= 0 | Y=8192 | | A=3 | 0 | 8192 | 0 |
| | B=3 | X=−128 | Y= 0 | | A=4 | −128 | 0 | 0 |
| marking 1120 | | LXY A=5 B=4 | | | | | | |
| | B=1 | X= 1 | Y= 0 | | A=5 | 1 | 0 | 0 |
| | B=2 | X= 0 | Y= 64 | | A=6 | 0 | 64 | 0 |
| increment | B=3 | S= −1 | Y= 0 | | A=7 | −1 | 0 | 0 |
| data | B=4 | X= 0 | Y= 96 | | A=8 | 0 | 96 | 0 |
| vertex 1121A | | LXY A=1 B=1 | | | A=1 | 96 | 576 | 0 |
| | | X= 96 Y= 576 | | | | | | |

Output to Rotation Stage 62

| | | | X | Y | Z |
|---|---|---|---|---|---|
| vertex 1111 | RXY A=1 S=0 B=3 | | 32 | 320 | 0 |
| | S= 32 Y= 320 | | 160 | 320 | 0 |
| | | | 160 | 8512 | 0 |
| | | | 32 | 8512 | 0 |

| | | | X | Y | Z |
|---|---|---|---|---|---|
| marking string | STG C=49 | | | | |
| | | A=5 | 97 | 576 | 0 |
| | | A=6 | 97 | 640 | 0 |
| | | A=7 | 96 | 640 | 0 |
| (1121B) | | A=8 | 96 | 736 | 0 |
| | | A=5 | 97 | 736 | 0 |
| | | A=6 | 97 | 800 | 0 |
| | | A=7 | 96 | 800 | 0 |
| (1121C) | | A=8 | 96 | 896 | 0 |
| | | . | . | . | |
| | | . | . | . | |
| (1121VV) | | A=8 | 96 | 8096 | 0 |
| | | A=5 | 97 | 8096 | 0 |
| | | A=6 | 97 | 8160 | 0 |
| | | A=7 | 96 | 8160 | 0 |
| (1121WW) | | A=8 | 96 | 8256 | 0 |
| | | | 97 | 8256 | 0 |
| | | | 97 | 8320 | 0 |
| | | | 96 | 8320 | 0 |

Figure 12B:
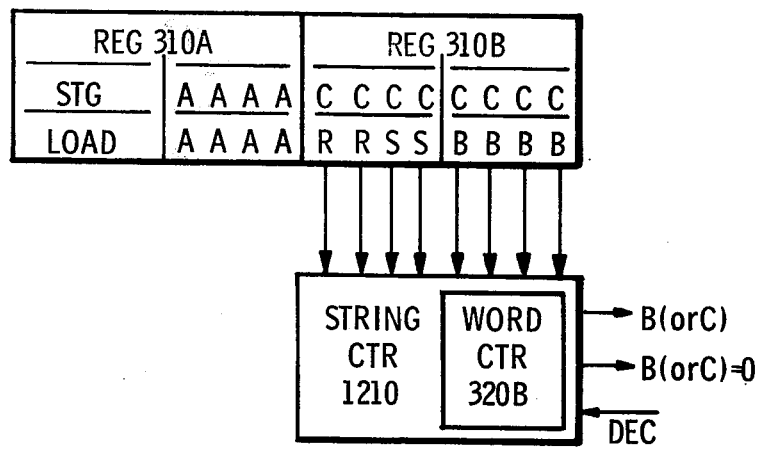

The embodiment of FIG. 12 is dedicated to a pattern of four repeating vertices forming identical four sided polygons. B is hardwired into the control logic for pattern generation. Word counter 320B is therefore not required for pattern generation and may be employed during that period as string counter 1210. In the more specific embodiment shown in FIG. 12B, B maximum for word counting=16 (four binary bits) and "C" maximum=256 (eight binary bits). The two counters may be combined as shown, with word counter 320B forming the first four bits of string counter 1210. The composite string-word counter of FIG. 12B may be formed by two 4 bit counters (74S163) in series. The word count and string count have identical unit decrement requirements and both outputs B=0 and C=0 to control logic 70 cause the next instruction from buffer register 306 (see FIG. 3) to be loaded into input register 310.

The four sided polygon embodiment of FIG. 10 may be employed to generate a series of identical equally spaced triangles by reducing the coordinates of one of the four vertices to X=0, Y=0, Z=0. This vertex is thereby positioned directly on top of the previous vertex causing a quasi three vertex face to be processed and appear on CRT display device 82. Each face of the quasi three vertex series may require the same processing time and effort as a straight four vertex face; but the scanning time on CRT 82 is reduced because of the smaller area involved. Quasi series of lines (two vertices) and points (one vertex) may be generated by setting the appropriate number of vertices to zero.

Alternatively, the control logic for translation stage 60 may be programmed to accomodate a range of word numbers, i.e., B=1 (a series of point objects) or B=2 (a series of line objects) or B=3 (triangle objects), or B=4 (the rectangle embodiment of FIG. 10A) or B=5 (pentagons) ... B=N (a N sided polygon).

Figure 14:
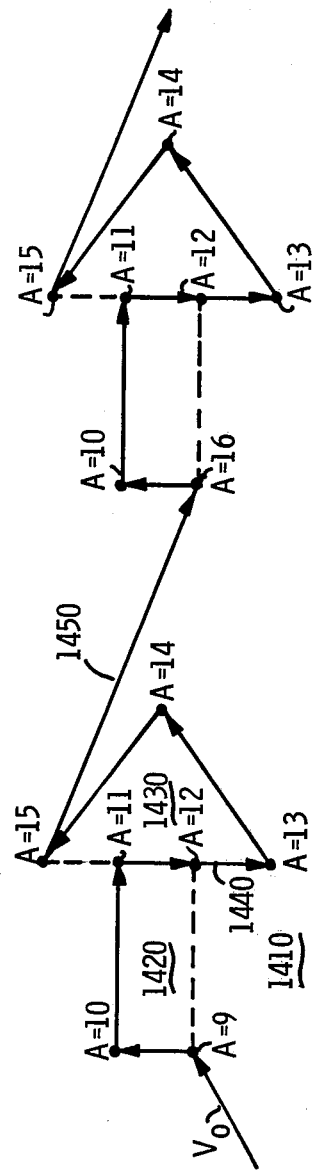
FIG. 14 shows a multifaced pattern unit.

The pattern or fundamental unit of the series of identical equally spaced units may be a composite of polygons such as the arrows 1410 shown in FIG. 14. Arrow 1410 may be considered a seven sided face or unit having seven vertices, four for the rectangular tail 1420 and three for the triangular head 1430. Arrow 1410 may be loaded into and retrieved from RAM 350 with a B=7 embodiment. Vector 1440 is the intraface increment between the last vertex of tail 1420 (stored at A=12) and the first vertex of triangle 1430 (stored at A=13), and is stored and processed at A=13 as an ordinary vertex position vector. Vector 1450 (stored at A=16) is the inter unit increment which indicates the end of each individual unit of the series causing the C counter to decrement.

CONCLUSION

The objects of this invention have been accomplished by providing a pattern unit which is repeated to form a series of equally spaced identical pattern units. Each series of pattern units requires shape data for one unit, a string instruction word including the number of pattern units in the series, and initial position data for only the first point of the initial pattern unit—a total of three instruction words and five data words for the forty nine unit center marking string 1320A-1320WW of FIG. 13.

The prior art technique of FIG. 10 for generating the same center marking series required shape data for one marking and initial position data for the first vertex of each marking—a total of fifty instruction words and fifty three data words.

It will be apparent to those skilled in the art that various changes may be made in the apparatus and techniques described without departing from the scope of the invention. For example, the pattern unit for a repeating series of faces may be a scaled version of previously loaded shape data. The shape data for runway 1010 may be scaled down by a factor of seven and employed as the shape data for center marking series 1320. Also, the pattern unit may be three dimensional to form the display of a row of identical tents or apartment buildings.

I claim as my invention:

1. An image data system for providing a two dimensional perspective display of object items within a three dimensional object coordinate system formed by polygon faces, including at least one object item formed by at least one series of equally spaced polygon pattern units of identical size and shape, each series of pattern units having an initial pattern unit which has an initial point, comprising:

data source means for providing image data in accordance with a predetermined data format including the following types of image data initial position data for defining the position of the initial point with respect to the object coordinate system for the initial pattern unit of each of the series of pattern units, shape data for defining the relative positions of the vertices of each initial pattern unit with respect to the initial point for that pattern unit, increment data for defining the uniform spacing between adjacent pattern units within each series of identical pattern units, series data for defining the number of identical pattern units within each series of identical pattern units, other data associated with each initial point for defining other visual parameters for each series of identical pattern units therefor, the image data having codes bits associated therewith for distinguishing between the initial position data and the shape data and the other data;

image data decoder means responsive to the code bits for processing each type of image data;

storage means for receiving shape data and increment data in response to the image data control means and for repeatedly providing the data in response to the initial position data;

series means for receiving series data and terminating the retrieval of the shape data and increment data from the storage means when the proper number of identical pattern units have been processed.

2. The system of claim 1, wherein the shape data is entered into the storage means at predetermined locations and is retrieved from the predetermined locations by the initial position data.

3. The system of claim 2, wherein the address of the predetermined locations is included in the shape data for entering the relative positions of the vertices of the pattern unit, and the addresses of the predetermined locations is included in the initial position data for repeatedly retrieving the relative positions of the vertices of the pattern unit.

4. The system of claim 1, wherein the initial point for each initial pattern unit is a vertex of that initial pattern unit.

5. The system of claim 1, wherein the increment data for each series of identical pattern units defines the position of the first vertex of each immediately subsequent pattern unit of the series with respect to the position of the last vertex of each immediately precedent pattern unit.

6. The system of claim 5, wherein the pattern unit forming the series of pattern units has four vertices with an initial vertex positionally defined by the initial position data and three dependent vertices positionally defined with respect to the initial vertex by relative position data within the storage means.

7. The system of claim 6, wherein the pattern unit is a rectangle.

8. The system of claim 6, wherein one of the dependent vertices has relative position coordinates of $X=0$, $Y=0$ and $Z=0$ and the pattern unit is a triangle.

9. The system of claim 6, wherein two of the dependent vertices have relative position coordinates of $X=0$, $Y=0$ and $Z=0$ and the pattern unit is a line.

10. The system of claim 6, wherein all of the dependent vertices have relative position coordinates of $X=0$, $Y=0$ and $Z=0$, and the pattern unit is a point.

11. The system of claim 5, wherein the pattern unit forming the series of identical equally spaced pattern units has N vertices forming an N sided polygon, with one initial vertex and $N-1$ dependent vertices.

12. The system of claim 11, wherein at least one of the $N-1$ dependent vertices has relative position coordinates of $X=0$, $Y=0$ and $Z=0$ and the pattern unit has less than N sides.

13. The system of claim 5, wherein initial position data is provided for a single initial point, and shape data is provided for a single initial face, and increment data is provided for a single series of equally spaced polygon faces of identical size and shape.

14. The system of claim 1, wherein the pattern unit is formed by a plurality of polygon faces in which the first vertex of each subsequent face is positionally defined relative to the last vertex of the previous face by an intrapattern unit increment.

15. The system of claim 1, further comprising an accumulator means which receives each initial point in response to the image data control means and receives the shape data for that initial point from the storage means in response to the image data control means for combining each initial point with the shape data therefor.

16. The system of claim 15, further comprising scale data included in the initial position data for defining the coordinates of the vertices of the pattern unit based on the shape data previously entered into the storage means; and scalor means responsive to the scale data for changing the dimensions of the edges of the pattern unit.

* * * * *